US010786857B2

(12) United States Patent
Hasegawa

(10) Patent No.: US 10,786,857 B2
(45) Date of Patent: Sep. 29, 2020

(54) WIRE ELECTRIC DISCHARGE MACHINE

(71) Applicant: FANUC Corporation, Yamanashi (JP)

(72) Inventor: Yasuo Hasegawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 227 days.

(21) Appl. No.: 15/277,935

(22) Filed: Sep. 27, 2016

(65) Prior Publication Data
US 2017/0087656 A1 Mar. 30, 2017

(30) Foreign Application Priority Data
Sep. 28, 2015 (JP) ................. 2015-189482

(51) Int. Cl.
B23H 1/10 (2006.01)
B23H 7/02 (2006.01)
B23H 7/20 (2006.01)

(52) U.S. Cl.
CPC .......... B23H 1/10 (2013.01); B23H 7/02 (2013.01); B23H 7/20 (2013.01); B23H 2500/20 (2013.01)

(58) Field of Classification Search
CPC ... B23H 9/00; B23H 9/08; B23H 1/10; B23H 7/36; G05B 19/182; G05B 2219/37444; G05B 2219/37452; G05B 2219/45043; G05B 2219/45221; G01B 7/008
USPC ............. 219/69.11–69.14, 69.11–69.19
See application file for complete search history.

(56) References Cited

U.S. PATENT DOCUMENTS

| | | | | | |
|---|---|---|---|---|---|
| 4,052,583 | A | * | 10/1977 | Inoue | B23H 7/04 219/69.12 |
| 2012/0031879 | A1 | | 2/2012 | Abe et al. | |
| 2013/0043216 | A1 | * | 2/2013 | Kouda | B23H 7/065 219/69.12 |

FOREIGN PATENT DOCUMENTS

| | | | |
|---|---|---|---|
| EP | 2415546 A1 | | 2/2012 |
| JP | 60-85829 A | | 5/1985 |
| JP | 03049833 A | * | 3/1991 |
| JP | 4-300123 A | | 10/1992 |
| JP | H5-74735 U | | 10/1993 |
| JP | 6-79539 A | | 3/1994 |

(Continued)

OTHER PUBLICATIONS

Extended European Search Report in EP Application No. 16190580.7, dated Feb. 2, 2017.

(Continued)

Primary Examiner — Tu B Hoang
Assistant Examiner — Diallo I Duniver
(74) Attorney, Agent, or Firm — Hauptman Ham, LLP

(57) ABSTRACT

A wire electric discharge machine has a tank containing a working fluid, a table in the tank for mounting a workpiece, upper and lower guides supporting a wire electrode, a measurement device detachable from or movable relative to an upper guide part having the upper guide, and including a sensor for measuring the workpiece after machining, a plate thickness acquisition unit for acquiring a plate thickness of the workpiece, a level detection unit for detecting a level of the working fluid in the tank, and a level adjustment unit for adjusting the level of the working fluid when measuring the workpiece on the basis of the relative position of the upper guide and the measurement device body, a position of the upper guide, and the plate thickness, to a level not lower than (Continued)

a height of an upper surface of the workpiece and not higher than the measurement device body.

11 Claims, 18 Drawing Sheets

(56) References Cited

FOREIGN PATENT DOCUMENTS

| JP | H7-9262 A | 1/1995 |
| --- | --- | --- |
| JP | 8-318431 A | 12/1996 |
| JP | 9-216130 A | 8/1997 |
| JP | 2009-279727 A | 12/2009 |

OTHER PUBLICATIONS

Decision to Grant a Patent in JP Application No. 2015-189482, dated Aug. 15, 2017, 6 pp.
Decision for Grant a Patent in KR Application No. 10-2016-0123933, dated May 21, 2018, 3pp.

* cited by examiner

RELATION BETWEEN DETECTED PRESSURE AND LEVEL

WIRE ELECTRIC DISCHARGE MACHINE

RELATED APPLICATIONS

The present application claims priority to Japanese Patent Application Number 2015-189482, filed Sep. 28, 2015, the disclosure of which is hereby incorporated by reference herein in its entirety.

BACKGROUND OF THE INVENTION

1. Field of the Invention

The present invention relates to a wire electric discharge machine, and particularly to a wire electric discharge machine having a function of measuring a workpiece remain immersed in a working fluid with a touch probe.

2. Description of the Related Art

In a wire electric discharge machine, upon completion of a machining operation of an object to be machined (hereinafter referred to as a "workpiece"), it is important to accurately measure the dimensions of the workpiece and to determine whether it has been machined properly. The measurement of the dimensions of the machined workpiece are generally effected after detaching it from the machine, and then the dimensions are measured by means of a special measuring machine such as a coordinate measuring machine (CMM) or a measuring microscope.

However, when dimensional error is found after measurement, it is necessary to rework the part for the correction of the error. Hence, it is also necessary to remount the once detached workpiece accurately to the wire electric discharge machine, and a reference starting position needs to be determined. This process requires many man-hours and skill. If remount of the detached workpiece for rework is failed, the dimensions cannot be corrected accurately by the rework.

In this connection, a method for measuring the workpiece upon completion of the machining operation without detaching it from the machine by employing a contact measurement device (hereinafter referred to as a "touch probe") attached to a body or upper guide part of a wire electric discharge machine has been proposed (see Japanese Patent Laid-Open No. 60-85829).

FIGS. 18 and 19 are flowcharts showing a conventional flow of working and measurement.

[Step sh01] Read the position of upper guide.
[Step sh02] Fill work tank with working fluid until upper guide is submerged.
[Step sh03] Detect level of working fluid to determine whether the filling operation is completed, and if completed (YES), proceed to Step sh04, and if not completed (NO), return to Step sh02.
[Step sh04] Start machining workpiece.
[Step sh05] Check whether work program is completed, and if completed (YES), proceed to Step sh06, and if not completed (NO), wait until completion of work program.
[Step sh06] Perform work tank drainage process, and proceed to Step sh07.
[Step sh07] Determine whether measurement program is linked (whether measurement program is to be executed after completion of work program), and if linked, measurement program is started, and if not linked, terminate the program.
[Step si01] Determine whether the drainage of work tank is completed, and if completed (YES), proceed to Step si02.
[Step si02] Read the set value of workpiece thickness.
[Step si03] Move upper guide to measuring height.
[Step si04] Lower touch probe.
[Step si05] Start measurement.
[Step si06] Determine whether the measurement program is completed, and if completed, proceed to Step si07, and if not completed, wait for completion of the measurement program.
[Step si07] Raise the touch probe, and terminate the process.

A method for correcting a measured value of the dimensions of the workpiece in view of an amount of thermal displacement caused by the temperature variation of the workpiece, and a set value of the temperature of the measuring environment has also been proposed (Japanese Patent Laid-Open No. 2009-279727). However, as mentioned in the problem to be solved by the invention, neither of the methods accurately obtains a measured value of the dimensions of the workpiece in the same environment as during the machining process.

A wire electric discharge machine generally performs machining within the working fluid, to prevent splashing of the working fluid, prevent corrosion of an upper surface of the workpiece while machining, and to suppress temperature variation. As has been described in the background art, conventionally, when measuring the workpiece without detaching it from the table, a work tank is completely drained of a working fluid, and then the workpiece is measured by a touch probe with removing the working fluid from the workpiece.

FIG. 20 is a diagram illustrating the principle how an error occurs when a workpiece is measured within a work tank vacant of a working fluid. If a work tank 23 is completely drained of a working fluid (water) at the time of the on-machine measurement, the working fluid on a workpiece upper surface 26a and around a machine table (hereinafter referred to as a "table") 24 starts to evaporate. At this time, heat of a workpiece 26 and the table 24 of metal material contacting the working fluid is deprived of as heat of evaporation, and thus the material contracts. As a result, the position and dimensions at the time of measurement are deviated from those obtained by machining in the working fluid, because of the temperature variation. This hinders accurate dimension measurement by a sensor 3a (of a probe 3).

SUMMARY OF THE INVENTION

In view of the above problem inherent in the prior art, an objective of the present invention is to provide a wire electric discharge machine having a function of measuring a workpiece remain immersed in a working fluid by means of a touch probe, and capable of a more accurate dimension measurement by causing the contraction and expansion of a workpiece and a table of metal material due to temperature variation hard to occur, so that there is substantially no deviations between the position and dimensions obtained by machining in a working fluid, and those at the time of measurement.

A wire electric discharge machine of the present invention includes a work tank containing a working fluid, a table provided in the work tank and on which a workpiece is mounted, an upper guide and a lower guide supporting a wire electrode, and a measurement device detachable from or movable relative to an upper guide part having the upper guide, and including a sensor, the wire electric discharge machine being configured to machine the workpiece immersed in the working fluid, and measure the workpiece by means of the measurement device after machining, and characterized by including: plate thickness acquisition means for acquiring a plate thickness of the workpiece, level detection means for detecting a level of the working fluid in the work tank, and level adjustment means for adjusting the level of the working fluid when measuring the workpiece with the measurement device on the basis of the relative position of the upper guide and a measurement device body, a position of the upper guide, and the plate thickness, to the level not lower than a height of an upper surface of the workpiece and not higher than the measurement device body.

Also, a wire electric discharge machine of the present invention includes a work tank containing a working fluid, a table provided in the work tank and on which a workpiece is mounted, an upper guide and a lower guide supporting a wire electrode, and a measurement device detachable from or movable relative to an upper guide part having the upper guide, and including a sensor on its tip end, the wire electric discharge machine being configured to machine the a workpiece immersed in the working fluid, and measure the workpiece by means of the measurement device after machining, and characterized by including: plate thickness acquisition means for acquiring a plate thickness of the workpiece, or plate thickness setting means; and level adjustment means for adjusting the level of the working fluid when measuring the workpiece with the measurement device on the basis of the level detected by level detection means for detecting a level of the working fluid in the work tank, to the level not lower than a height of an upper surface of the table on which the workpiece is mounted, and not higher than a height of an upper surface of the workpiece.

According to the wire electric discharge machine of the present invention as described above, even when the workpiece is immersed only on the lower surface thereof, the measurement accuracy can more stably be achieved with respect to that not immersed at all and started to dry. The object of the present invention can partially be achieved only by immersing to the upper surface of the table, since the table will dry and surely be deformed unless the leg or legs of it is immersed.

Also, a wire electric discharge machine of the present invention includes a work tank containing a working fluid, a table provided in the work tank and on which a workpiece is mounted, an upper guide and a lower guide supporting a wire electrode, and a measurement device detachable from or movable relative to an upper guide part having the upper guide, and including a sensor on its tip end, the wire electric discharge machine being configured to machine the workpiece immersed in the working fluid, and measure the workpiece by means of the measurement device after machining, and characterized by including: level detection means for detecting a level of the working fluid in the work tank; and level adjustment means for adjusting the level of the working fluid when measuring the workpiece with the measurement device on the basis of a position of the upper guide, and a distance from the position, to a tip end of the sensor of the measurement device at a position where the sensor is attached to the upper guide, or at a position to which the sensor is lowered while being fixed in a vertically movable manner, by controlling water supply to the work tank and water discharge from the work tank, so that the level detected by the level detection means varies in conjunction with the position of the tip end of the sensor of the measurement device at the position where the sensor is attached to the upper guide, or at the position to which the sensor is lowered while being fixed in a vertically movable manner.

Also, a wire electric discharge machine of the present invention includes a work tank containing a working fluid, a table provided in the work tank and on which a workpiece is mounted, an upper guide and a lower guide supporting a wire electrode, and a measurement device detachable from or movable relative to an upper guide part having the upper guide, and including a sensor on its tip end, the wire electric discharge machine being configured to machine the workpiece immersed in the working fluid, and measure the workpiece by means of the measurement device after machining, and characterized by including: level detection means for detecting a level of the working fluid in the work tank; and level adjustment means for adjusting the level of the working fluid when measuring the workpiece with the measurement device, by obtaining a distance from a preset upper guide position to a tip end of the sensor, and a distance from an upper surface of the table to the body of the sensor, and controlling water supply to the work tank and water discharge from the work tank, so that the level detected by the level detection means varies in conjunction with the position of the sensor of the measurement device, and also adjusting such that the level is not lower than the height of the upper surface of the table on which the workpiece is mounted, and not higher than a body of the measurement device.

The level detection means may use a pressure sensor to detect hydraulic pressure near the bottom of the work tank, or pneumatic pressure into which the hydraulic pressure is converted, and calculates a height of the level according to the detected pressure.

Also, a wire electric discharge machine of the present invention includes a work tank containing a working fluid, a table provided in the work tank and on which a workpiece is mounted, an upper guide and a lower guide supporting a wire electrode, and an optical measurement device detachable from or movable relative to an upper guide part having the upper guide, and including a camera and having a measuring function of recognizing an image of a measuring part and detecting an edge part, the wire electric discharge machine being configured to machine the workpiece immersed in the working fluid, and measure the workpiece by means of the measurement device after machining, and characterized by including: any one of plate thickness acquisition means for acquiring a plate thickness of the workpiece, and setting means; and level adjustment means using level detection means for detecting a level of the working fluid in the work tank, to adjust the level of the working fluid when measuring the workpiece with the measurement device, to a level not lower than a height of an upper surface of the table on which the workpiece is placed, and not higher than a height of an upper surface of the workpiece.

In accordance with the present invention, a wire electric discharge machine can be provided having a function of measuring with a touch probe a workpiece remain immersed in a working fluid, and capable of a more accurate dimension measurement by causing less contraction and expansion of a workpiece and a table of metal material under the effect of temperature variation, so that there is little deviation between the position and dimensions obtained by machining in a working fluid, and those at the time of measurement.

BRIEF DESCRIPTION OF THE DRAWINGS

The aforementioned and other objectives and characteristics of the present invention will be made clear from the following description of examples, which will be given with reference to the accompanying drawings. Of the drawings.

DETAILED DESCRIPTION OF THE PREFERRED EMBODIMENTS

The embodiments of the present invention will now be described with reference to the drawings.

Figure 1A:
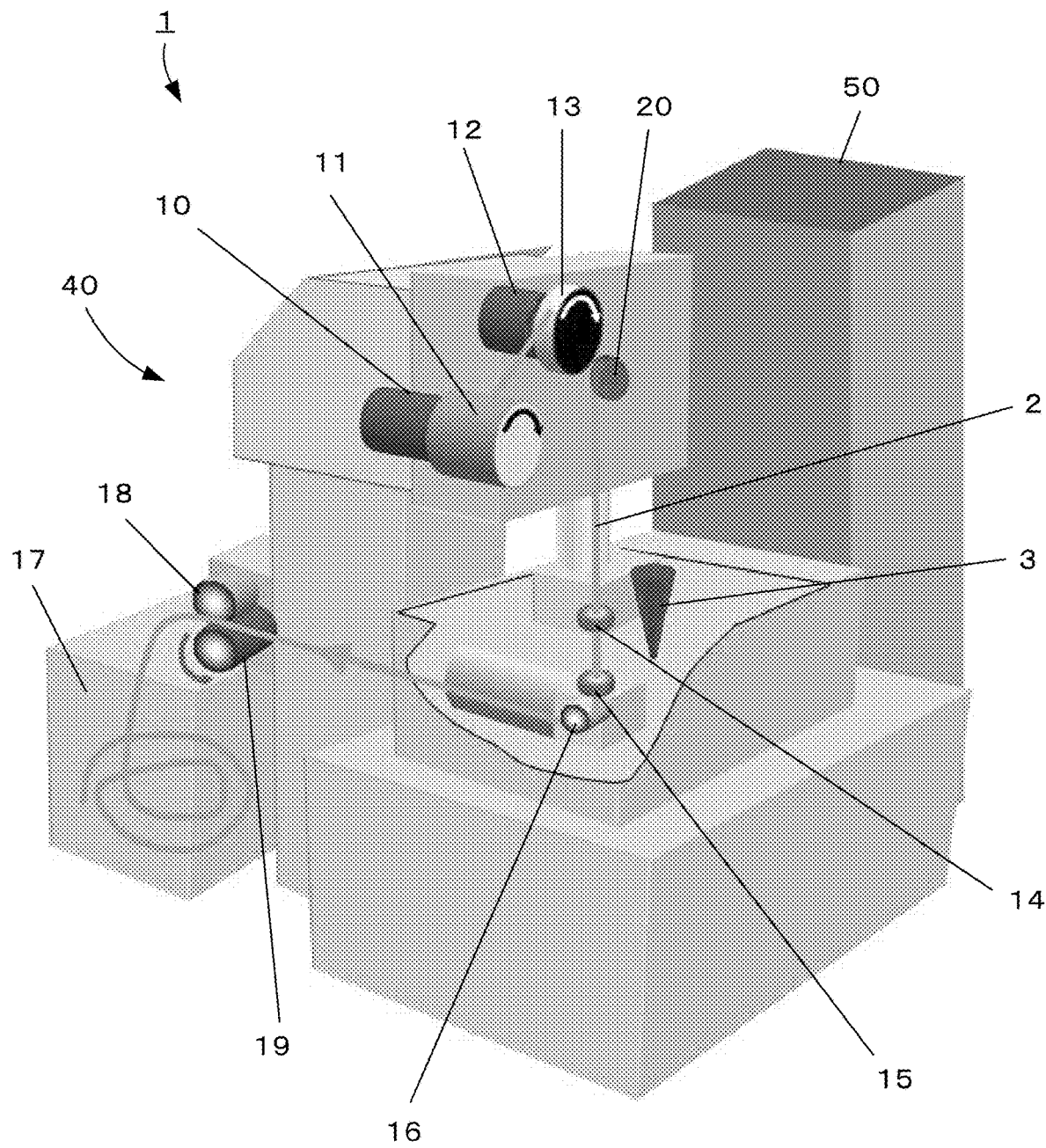
FIG. 1A is a schematic diagram illustrating a wire electric discharge machine of the present invention.

FIG. 1A is a schematic diagram illustrating a wire electric discharge machine of the present invention. A wire electric discharge machine 1 includes a wire electric discharge machine body 40 and a controller 50 for controlling the body 40. A wire bobbin 11 around which a wire electrode 2 is wound is given a predetermined low torque, which is directed in the opposite direction of a pullout direction of the wire electrode 2, by a delivery torque motor 10.

Figure 5:
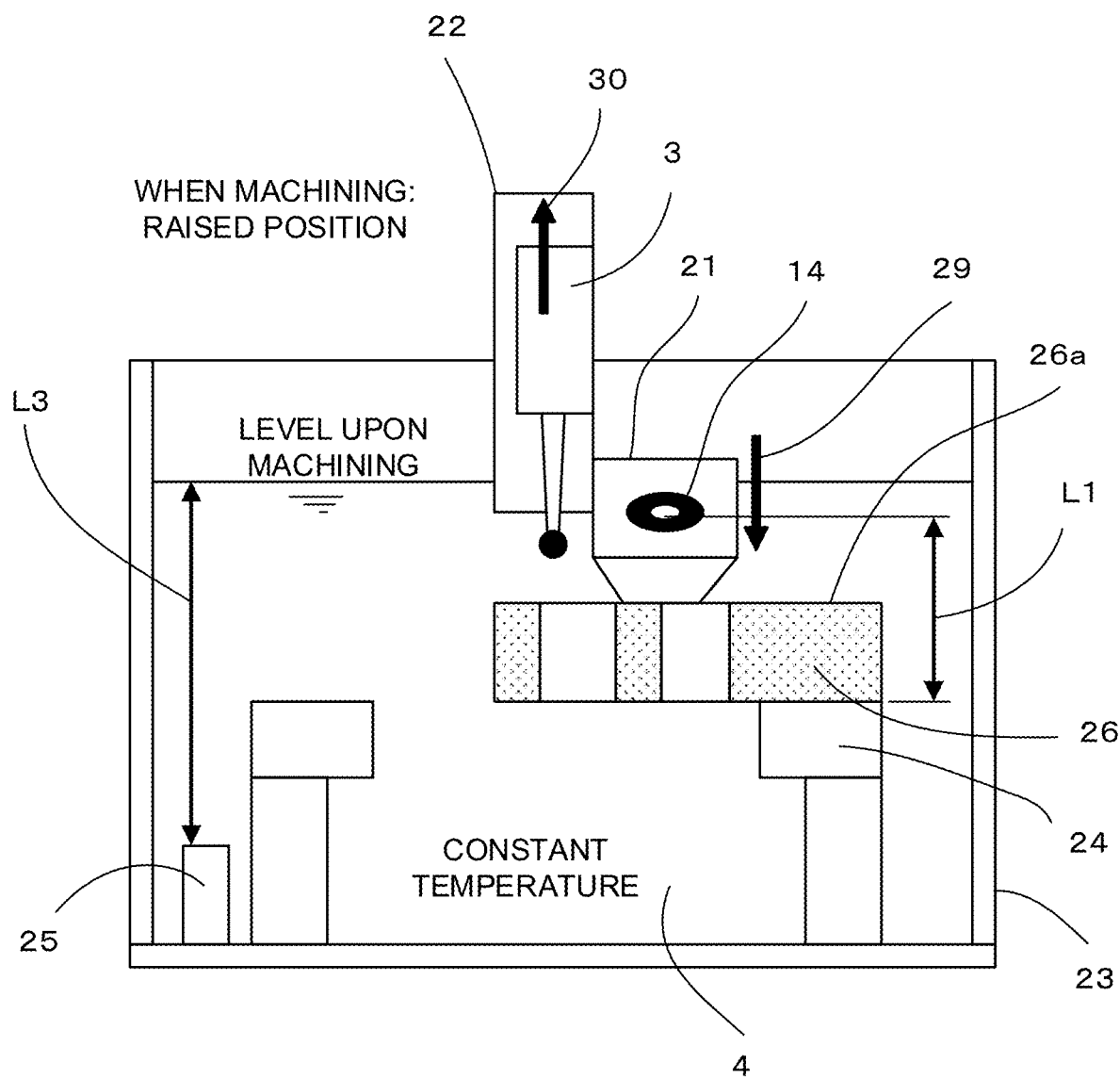
FIG. 5 is a diagram illustrating the principle for controlling the level upon machining a workpiece by a wire electric discharge machine.

The wire electrode 2 pulled out from the wire bobbin 11 is threaded over multiple guide rollers (not shown), and its tension between a brake shoe 13 driven by a brake motor 12 and a feed roller 19 driven by a wire electrode delivery motor (not shown) is adjusted by the brake shoe 13. A tension detector 20 is a detector for detecting the magnitude of tension in the wire electrode 2 running between an upper guide 14 and a lower guide 15. Also, as shown in FIG. 5, an upper guide part 21 accommodates the upper guide 14.

The wire electrode 2 having passed the brake shoe 13 passes the upper guide 14, the lower guide 15, and a lower guide roller 16, is pinched by a pinch roller 18 and the feed roller 19 driven by the wire electrode delivery motor (not shown), and is collected into a wire electrode collection box 17.

A holding part 22 holding a touch probe 3 is attached to the upper guide part 21. The holding part 22 has a function of projecting and retracting the touch probe 3. In other words, the touch probe 3 is attached to the upper guide part 21, through the holding part 22 that has the projecting or retracting function. The touch probe 3 includes a sensor 3a having a tip end of spherical configuration. The touch probe 3 is attached such that the projecting and retracting function allows it to move vertically, parallel to the running direction of the wire electrode 2. The touch probe 3 is a sensor that outputs a signal upon contacted the tip end thereof with an object to be measured (workpiece). When not measuring, the touch probe 3 is raised to a retracted position.

Figure 1B:
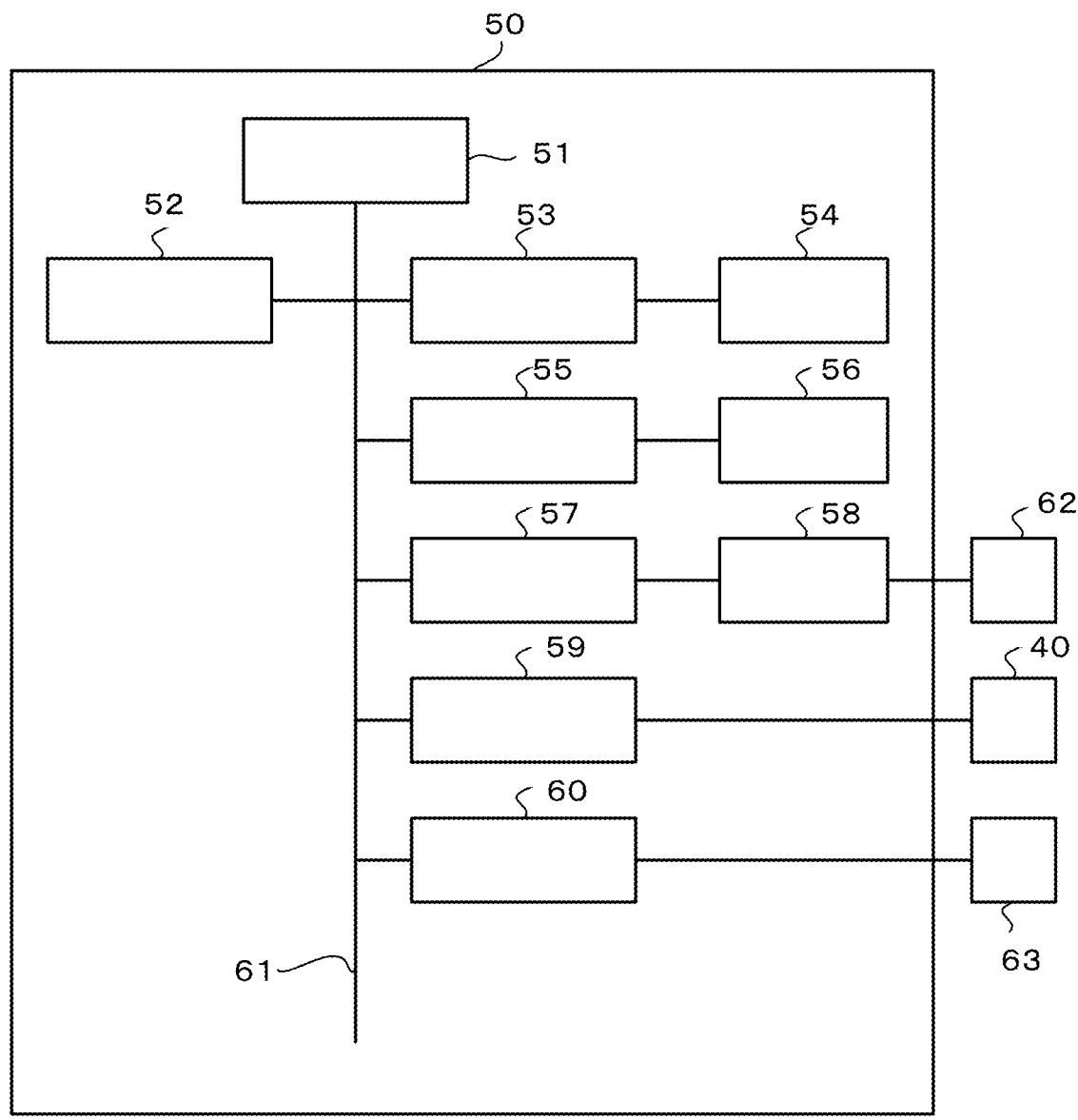
FIG. 1B is a schematic diagram illustrating a controller for controlling a wire electric discharge machine body.

FIG. 1B is a schematic diagram illustrating the controller 50 for controlling the wire electric discharge machine body 40. When measuring a part of the workpiece 26 to be measured with the touch probe 3, the touch probe 3 can be lowered to position the tip end of the sensor 3a of the touch probe 3 in a predetermined position. Additionally, the upper guide 14 may include a U-axis drive mechanism and a V-axis drive mechanism (not shown) to adjust the XYZ axis positions thereof. With this mechanism, the taper machining of the workpiece (cutting tool) can also be effected.

The wire electric discharge machine body 40 machines a workpiece under the control of the controller 50 shown in FIG. 1A. The controller 50 includes a processor (CPU) 51, a memory 52 such as a RAM and a ROM, a display interface 53, a display device 54, a keyboard interface 55, a keyboard 56, a servo interface 57, a servo amplifier 58, and an input/output interface 60 for exchanging signals with external devices. The above elements are mutually connected through a bus 61.

The servo amplifier 58 drives a servo motor 62. "Servo motor 62" refers to servo motors corresponding to the respective drive shafts of the X-axis, Y-axis and Z-axis, and indicates servo motors of a number corresponding to the required drive shafts. The servo motor 62 provided in each shaft includes an unillustrated position detector for detecting positions. Position detection signals detected by the position detectors of the servo motor 62 are fed back to the controller 50. In the embodiments of the present invention, the servo motor 62 also drives the driving part of the holding part 22, which projects and retracts the probe 3.

The wire electric discharge machine body 40 including a machining power source is controlled through an interface 59. When a work program is started, an instruction to turn on the machining power source is given through the interface 59. When it is intended to turn off the machining power source, an instruction is also provided to the wire electric discharge machine body 40 through the interface 59. An input/output device 63 exchanges input/output signals through the input/output interface 60.

In the wire electric discharge machine 1, the level of a working fluid (level) upon machining is normally automatically adjusted in cooperation with the height of the upper guide 14, by detecting the level of the water surface (the level of the working fluid 4) inside the work tank 23 by a level detector (float switch) (not shown) attached to the upper guide part 21. This level is normally set in a level where the working fluid 4 does not splash and can absorb the heat energy provided by a current supply part (i.e. electrode pin) of the upper guide part 21. The level is generally adjusted to that 50 to 100 mm above the upper surface of the workpiece.

Figure 6:
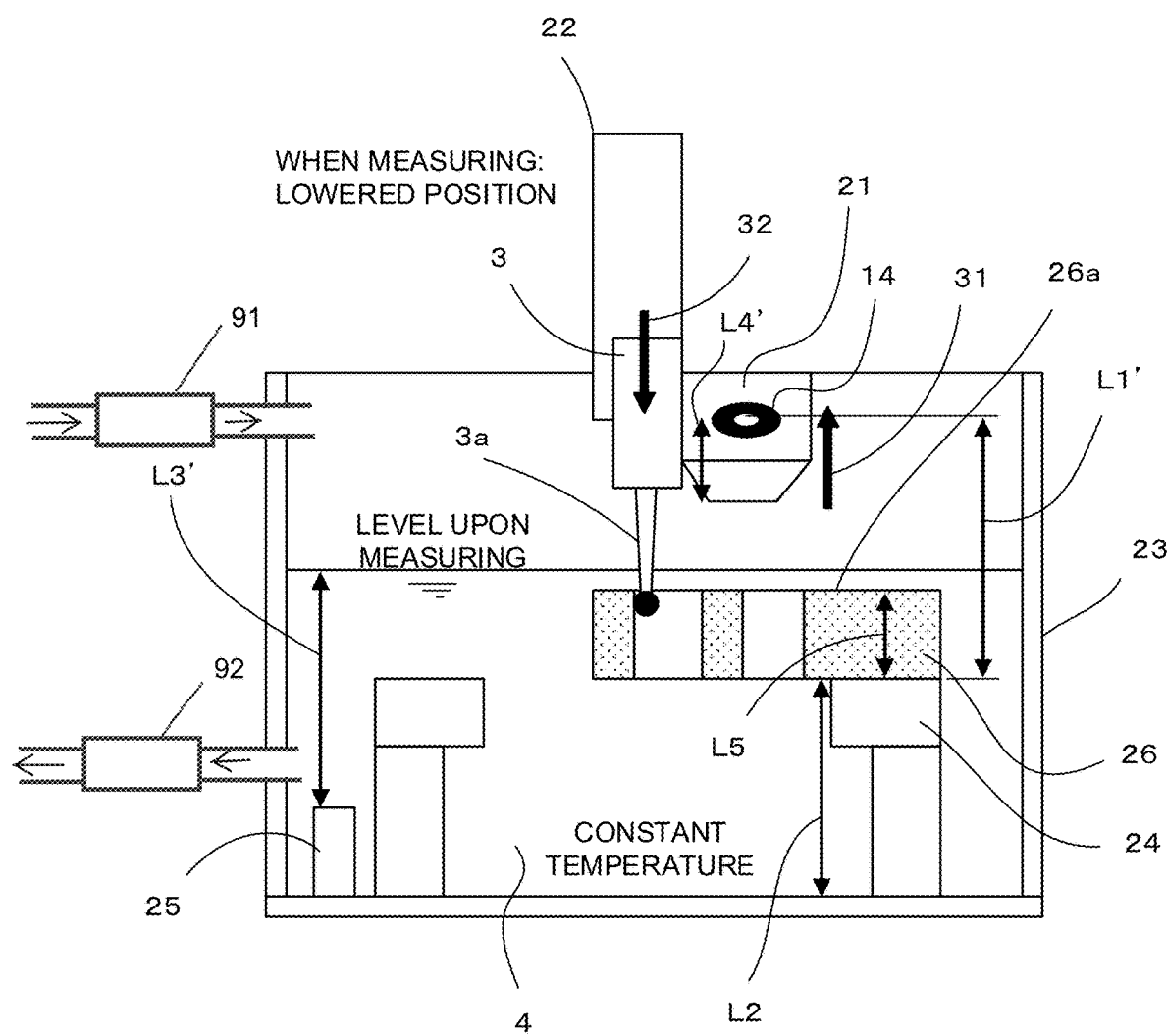
FIG. 6 is a diagram illustrating the principle for controlling the level upon measuring in Embodiment 1.

As shown in FIG. 6, when measuring, the sensor 3a of the touch probe 3 detects the worked surface below a workpiece upper surface and above a workpiece lower surface, at a height between a position about 10 mm lower than the workpiece upper surface 26a and about the center of the thickness of the workpiece. Hence, the sensor is adapted to be positioned lower than a nozzle lower surface of the upper guide part 21, which comes into close contact with the workpiece 26.

In order to prevent the sensor 3a of the touch probe 3 from interfering with the workpiece upon machining, in some cases the touch probe 3 is adapted to be retracted upward by a raising and lowering system (i.e. holding part 22 having function of projecting and retracting the probe 3) when machining, and is lowered when measuring to place the sensor 3a below the upper guide part 21. In other cases, the touch probe 3 can be detached by a detachable fixing system. In this situation, the level control scheme on machining raise the level to submerge the upper guide part 21 and also the body of the touch probe 3. This may lead to the malfunction of the expensive detector for measurement.

Hence, a mechanism is used for adjusting the level in conjunction with the height of the upper guide 14 (upper guide part 21). In this mechanism, the level may be measured by using a pressure sensor for detecting hydraulic pressure of the working fluid 4 instead of the float switch, as a method for detecting the level, and the height of the upper guide part 21 may be read with a numerical control device through the motor and position detector. A hydraulic pressure sensor 25 is adapted to measure that near the bottom of the work tank 23. When measuring the dimensions of a workpiece with the touch probe 3, in accordance with an embodiment of the present invention, the level is controlled to a height obtained by subtracting a distance to the tip end of the sensor 3a of the touch probe 3, from the submerged position of the upper guide part 21.

When machining, a level detector such as a level sensor 25 for detecting pressure automatically adjusts the level in conjunction with the height of the upper guide 14, to a level where the upper guide part 21 can be sufficiently submerged in the working fluid 4 to prevent splashing of the working fluid 4 and to cool the power feeder element or the feeder of the upper guide part 21, while the upper guide part 21 is brought close to the workpiece upper surface 26a. At this time, the touch probe 3 is positioned in a raised position by the holding part 22, and therefore does not interfere with the workpiece 26 and is not submerged. The touch probe 3 may be detached.

Figure 2:
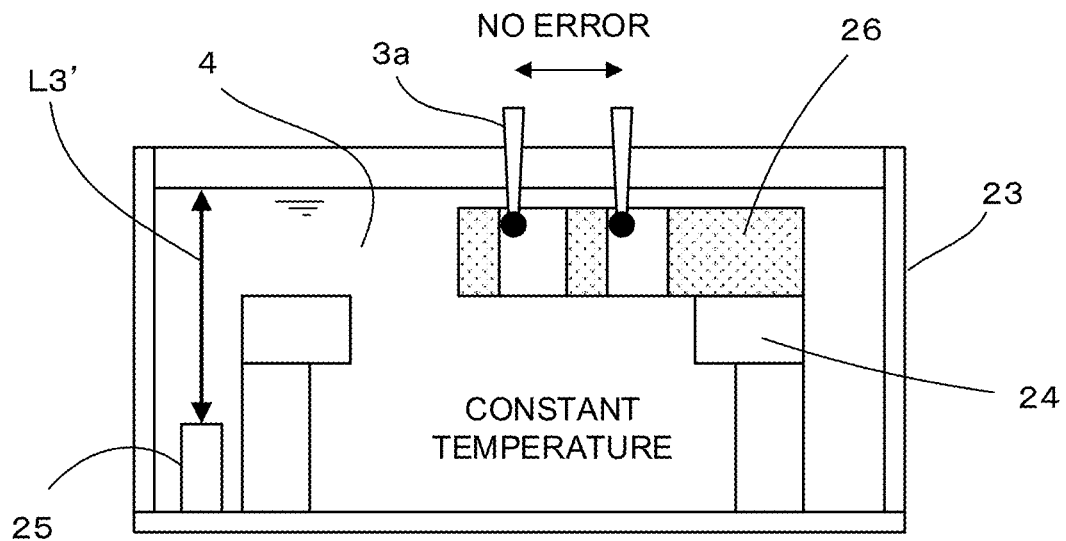
FIG. 2 is a diagram illustrating the principle of the reduction of the occurrence of an error while the measurement of the workpiece is effected under the fully immersed condition within the working fluid contained in the work tank.

When measuring, the upper guide part 21 is raised, and the touch probe 3 is positioned in a lowered position, or is attached to the upper guide part 21. FIG. 2 is a diagram illustrating the principle of the reduction of the occurrence of an error while the measurement of the workpiece is effected under the fully immersed condition within the working fluid 4 contained in the work tank 23. When measuring, the working fluid 4, the temperature thereof is adjusted to the same temperature as on the machining, is remain occupied the tank to suppress the temperature variation of the workpiece 26 and the machine table. The same system as that used when machining is adopted, as a mechanism for controlling the level of the working fluid 4 (level sensor 25 and components such as an unillustrated valve opening and closing switch and pump or so).

A level sensor 25 that detects hydraulic pressure near the bottom of a work tank, and has a processor for calculating a level depending on the hydraulic pressure may be used. Unlike a float switch fixed to the upper guide part to detect the level, this level sensor 25 can adjust the level to the height of the touch probe 3 when the touch probe is lowered, even when the upper guide 14 is raised and the float switch leaves the water surface. By performing control to maintain a level where the touch probe body is not submerged and the workpiece upper surface 26a is immersed, an optimal level can be maintained.

Figure 3:
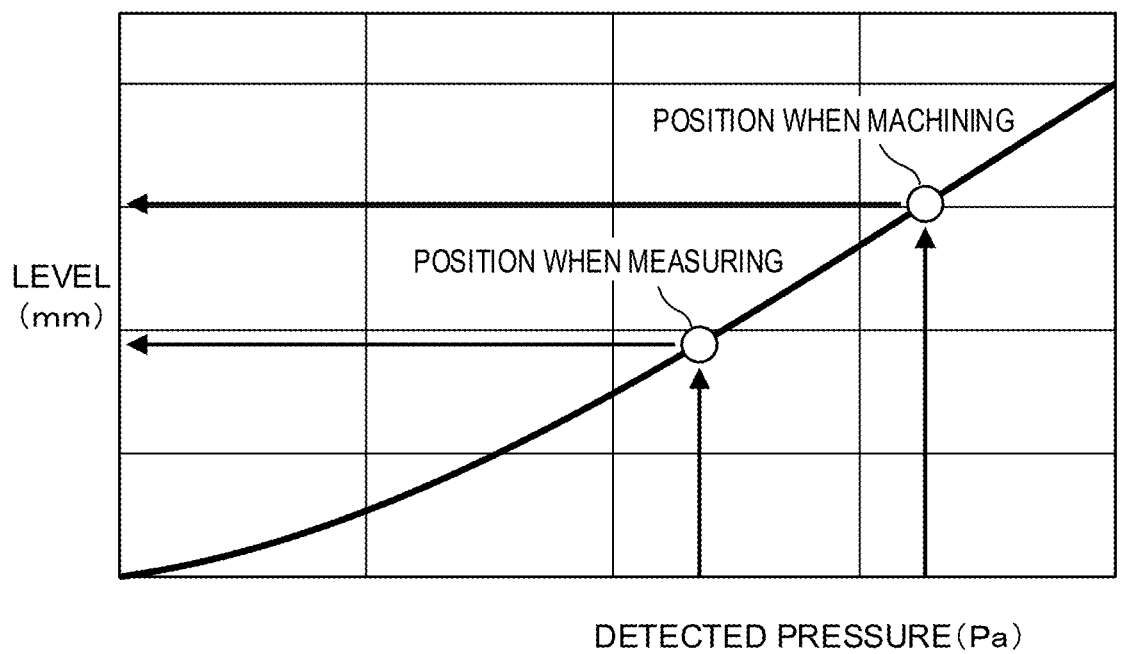
FIG. 3 is a graph showing a relation between the detected pressure and the level.

FIG. 3 is a graph showing a relation between detected pressure and the level (the level of working fluid 4). The level inside the work tank 23 can be controlled based on a pressure Pa detected by the level sensor 25.

Figure 4:
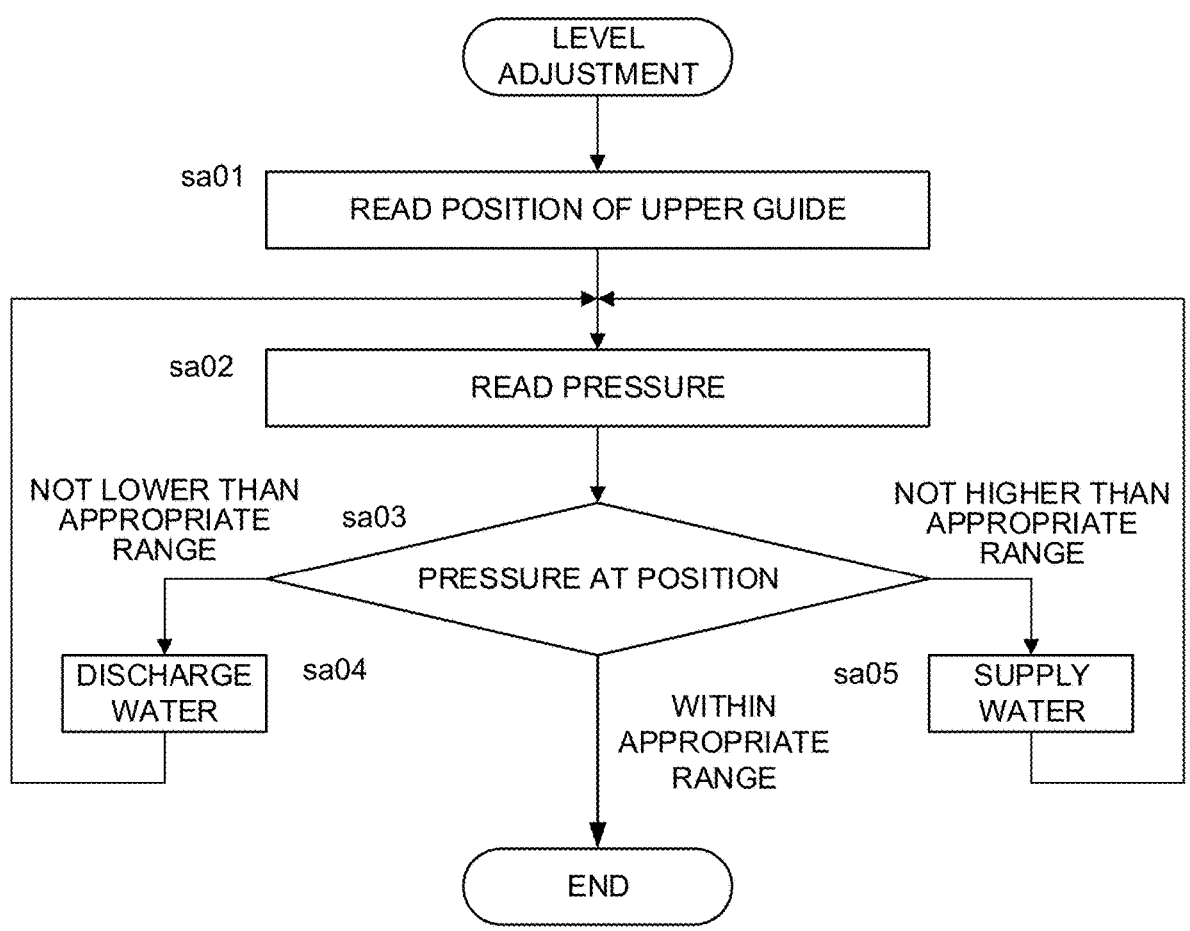
FIG. 4 is a flowchart illustrating the level adjustment of an embodiment of the present invention.

FIG. 4 is a diagram illustrating the flowchart of the embodiment of the present invention for adjusting the level inside a work tank. A description of the flowchart will be given below, according to the steps.

[Step sa01] Read the position of upper guide.
[Step sa02] Read the pressure represented by the level sensor.
[Step sa03] Determine whether pressure at measuring position exceeds appropriate range, falls below appropriate range, or is within appropriate range, and if it exceeds appropriate range, proceed to Step sa04, if it falls below appropriate range, proceed to Step sa05, and if it is within appropriate range, terminate processing of level adjustment.
[Step sa04] Discharge water, and return to Step sa02.
[Step sa05] Supply water, and return to Step sa02.

Embodiment 1

(When Machining)

FIG. 5 is a diagram illustrating the principle for controlling the level upon machining a workpiece 26 by a wire electric discharge machine 1.

The level is automatically adjusted in conjunction with a upper guide height L1 upon machining, to a level (working fluid level L3 measured by hydraulic pressure sensor 25) where an upper guide part 21 can be lowered (see reference numeral 29) to be sufficiently submerged in a working fluid 4 to prevent splashing of the working fluid 4 and to remove the heat energy produced by supplying the electricity to the upper guide part 21 (i.e. for cooling the feeder), while the upper guide part 21 is brought close to a workpiece upper surface 26a. To avoid interference of the sensor of a touch probe 3 with the workpiece 26 and submergence of the body, the touch probe 3 is driven by a holding part 22 to move in a probe rising direction 30, and is positioned ascendant with respect to the upper guide part 21. The touch probe 3 may be detached from the wire electric discharge machine 1.

(When Measuring)

FIG. 6 is a diagram illustrating the principle for controlling the level upon measuring in Embodiment 1. The upper guide part 21 is raised (see reference numeral 31), and the touch probe 3 is positioned in a lowered position (see reference numeral 32). A level detector such as a hydraulic pressure sensor 25, and a working fluid supply device 91 and a discharge device 92 automatically adjust the level of a working fluid, to a position where the upper surface 26a of the workpiece 26 is submerged in the working fluid 4 and the body of the touch probe 3 is not immersed. That is, by using preset information on a table upper surface height position L2 of a table 24 on which the workpiece 26 is mounted, and information on a workpiece thickness L5, as well as the information of the position of the upper guide obtained from a numerical control device, the level is set not lower than the height of the upper surface of the workpiece and not higher than the body of the touch probe 3.

$$\text{table upper surface height } L2+\text{workpiece thickness } L5 \leq \text{working fluid level on measurement } L3' \leq \text{table upper surface height } L2+\text{upper guide height on measurement } L1'-\text{measurement device body position on measurement } L4' \quad \text{(Expression 1)}$$

Note that (upper guide height on measurement $L1'$-measurement device body position on measurement $L4'$) corresponds to "a relative position between an upper guide and a measurement device body" described in the claims. The measurement device body position on measurement $L4'$ corresponds to a distance from the height of the upper guide when measuring, to a lowermost part of the casing of the holding portion 22 of the probe 3.

Hence, when measuring, it is possible to prevent thermal displacement of the table 24 of stainless steel of high linear expansion coefficient on which the workpiece 26 is mounted, and an additional sub-table for supporting the workpiece 26. It is also possible to prevent thermal displacement of the entire workpiece 26 caused by temperature variation. Since this can reduce the dimensional deviation between the machining position and the measuring position caused by temperature variation, the dimensions can be measured far more accurately than measuring after discharging the working fluid 4. The thermal expansion or contraction of the workpiece 26 and table 24 of metallic material are less likely to be caused by temperature variation. There is little deviation between the position and dimensions obtained by machining in the working fluid 4 and those at the time of measurement, so that the dimensions can be measured more accurately.

Figure 7:
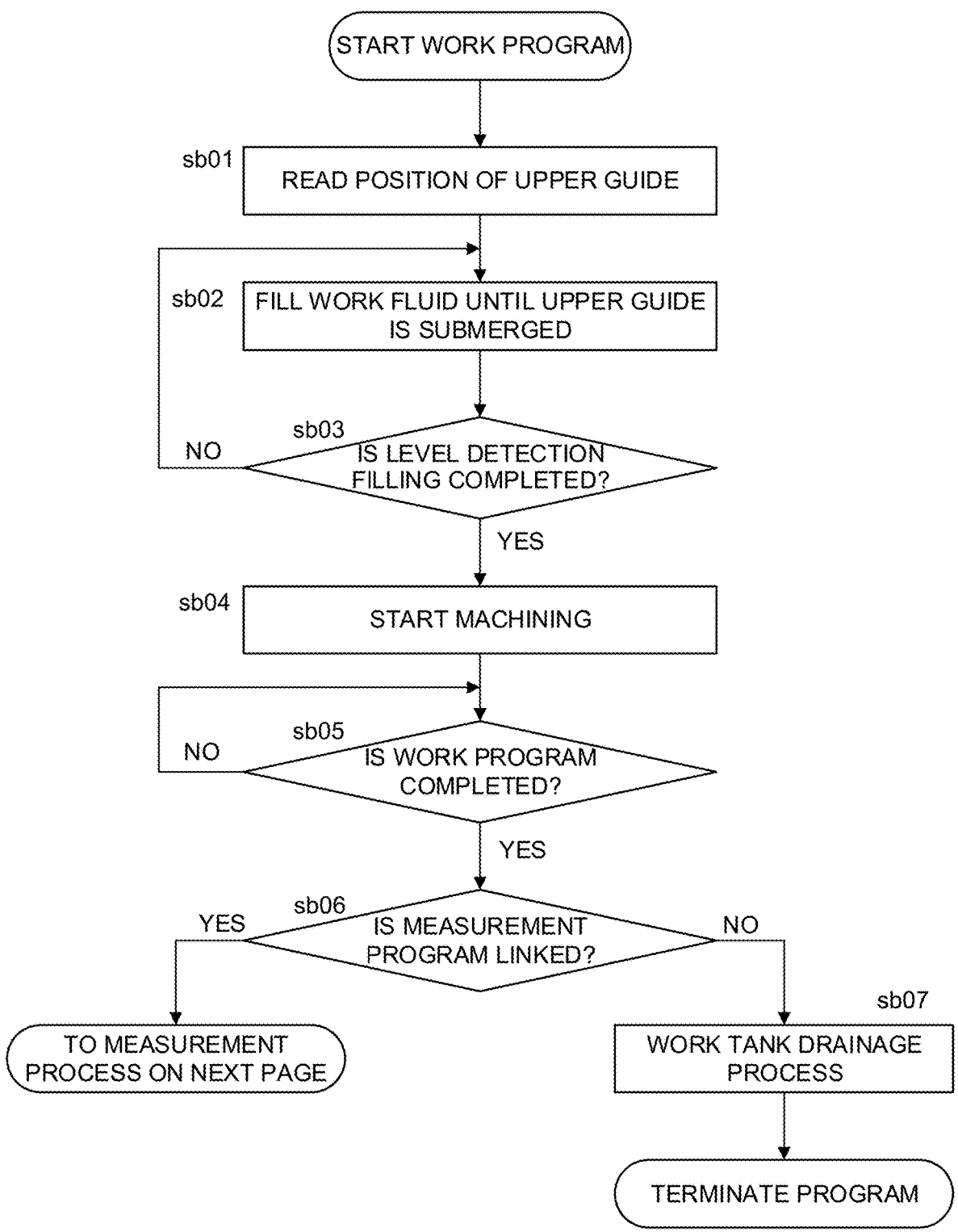
FIG. 7 is a flowchart showing the process of work program when machining.
Figure 8:
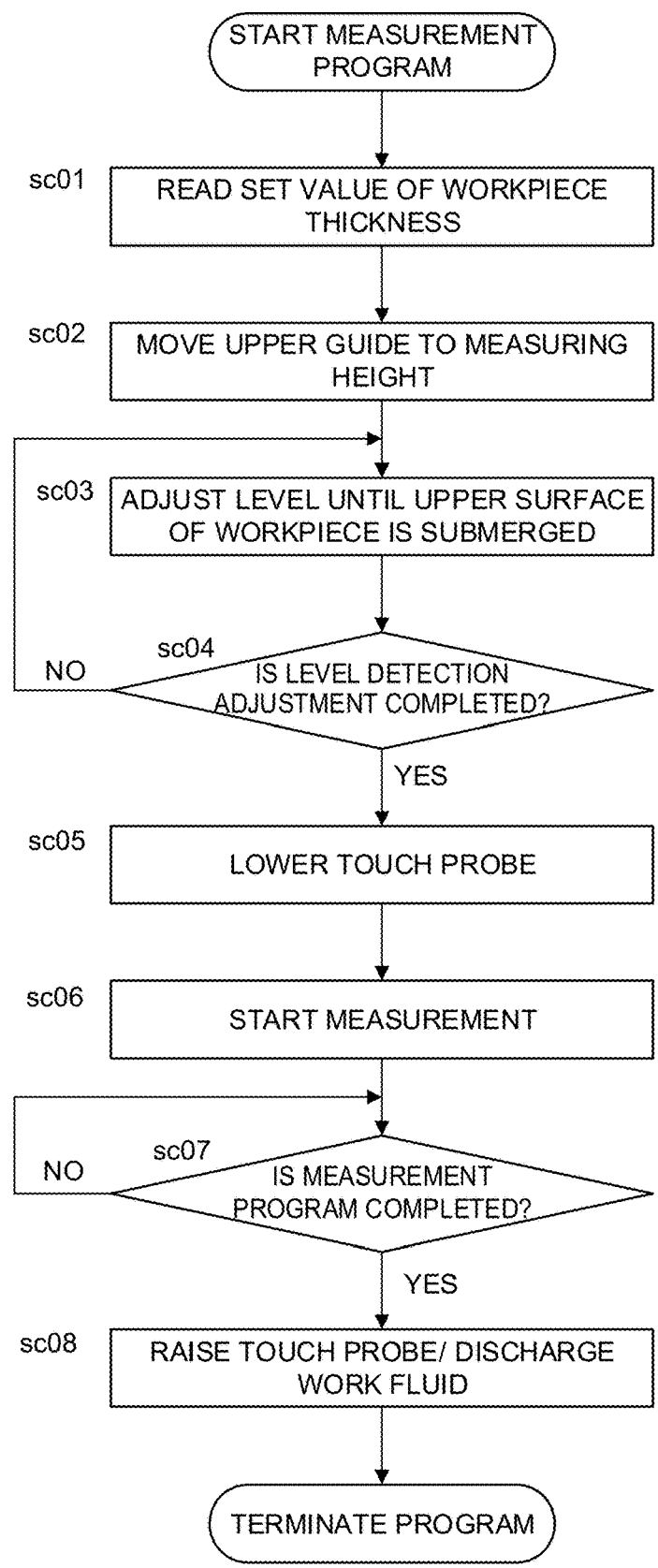
FIG. 8 is a flowchart showing the process of measurement program when measuring.

FIGS. 7 and 8 are flowcharts illustrating the process to be effected in the Embodiment 1 of the present invention. FIG. 7 is a flowchart showing the process for machining the workpiece through the machining program. The machining program will now be described with reference the following steps.

[Step sb01] Read the position of upper guide.
[Step sb02] Fill the work tank with the working fluid until upper guide is submerged.
[Step sb03] Detect the level to determine whether filling is completed, and if completed, proceed to Step sb04.
[Step sb04] Start machining.
[Step sb05] Determine whether machining program is completed, and if completed, proceed to Step sb06. If not completed, wait until completion.
[Step sb06] Determine whether the measurement program is linked, and if not linked, proceed to Step sb07, and if linked, start measurement program.
[Step sb07] Perform work tank drainage process, and terminate the process.

FIG. 8 is a flowchart showing the process of a measurement program of Embodiment 1.
[Step sc01] Read preset value of workpiece thickness.
[Step sc02] Move upper guide to measuring height.
[Step sc03] Adjust level until workpiece upper surface is submerged.
[Step sc04] Determine whether the adjustment through level detection is completed, and if completed, proceed to Step sc05, and if not completed, return to Step sc03.
[Step sc05] Lower touch probe.
[Step sc06] Start measurement.
[Step sc07] Determine whether the measurement program is completed, and if completed, proceed to Step sc08 and if not completed, wait for completion of measurement program.
[Step sc08] Raise touch probe, discharge the working fluid, and terminate the process.

The following is supplementary explanation about the flowchart described above. Step sc01 corresponds to plate thickness acquisition means of the scope of claims. Step sc03 corresponds to level adjustment means.

Embodiment 2

Figure 9:
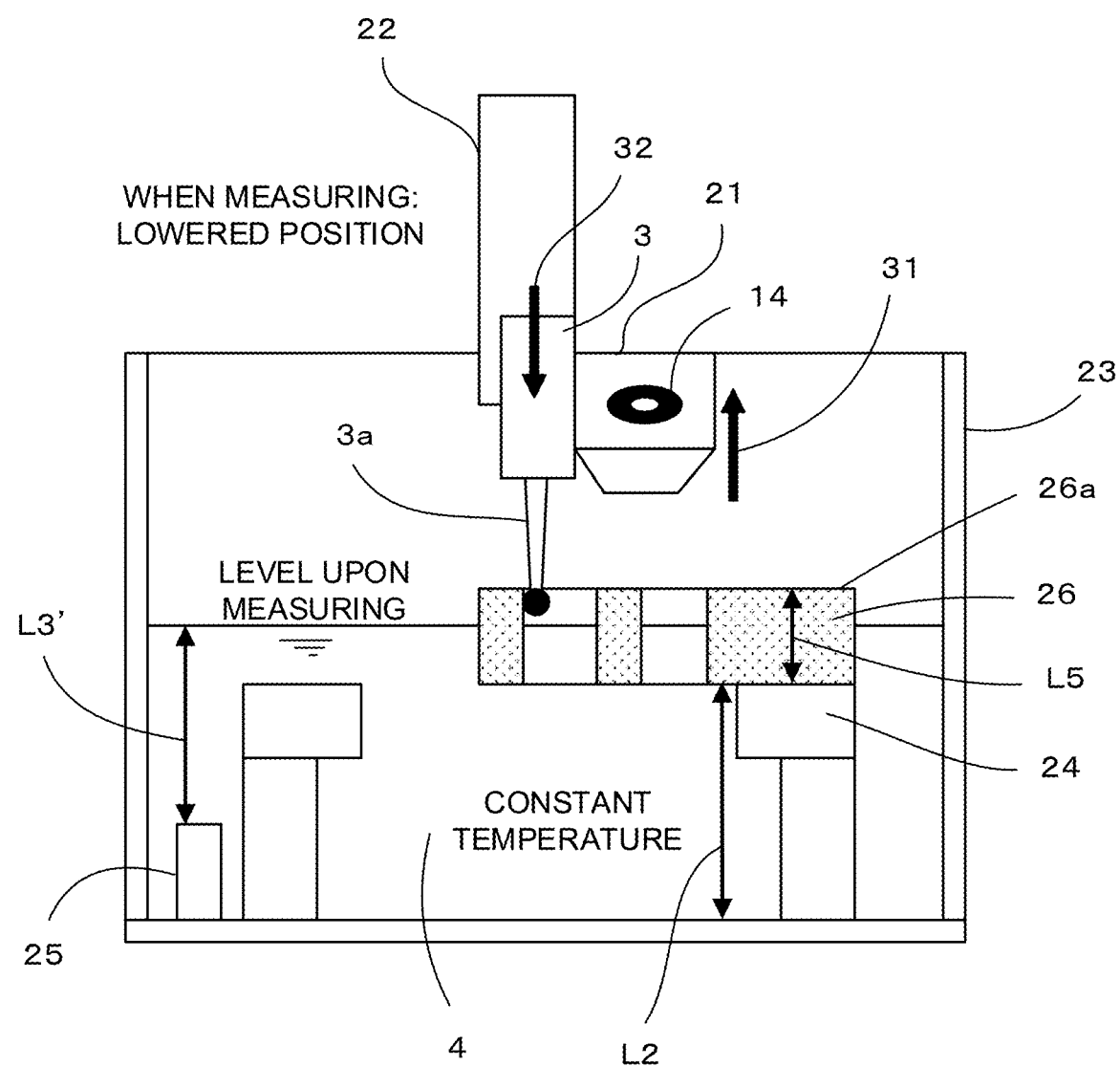
FIG. 9 is a diagram illustrating the principle for controlling the level upon measuring in Embodiment 2.

(When Machining)
The steps effected upon working are the same as those explained in the description of the first embodiment so that no explanation are made to avoid the duplication.
(When Measuring)
FIG. 9 is a diagram illustrating the principle for controlling upon measurement in Embodiment 2. When measuring, an upper guide part 21 is raised (see reference numeral 31), and a touch probe 3 is positioned in a lowered position (see reference numeral 32), or the probe 3 is attached to the upper guide part 21. Then, a level detector such as a hydraulic pressure sensor 25, and a working fluid supply device and discharge device automatically adjust the level of a working fluid, to a position where a lower surface of a workpiece 26 is immersed, and a table 24 and an unillustrated workpiece attachment jig attached between the workpiece 26 and the table 24 are completely submerged. That is, by using preset information on the high L2 of the upper surface of the table on which the workpiece 26 is mounted, and information on a workpiece thickness L5, the level is set not lower than the table upper surface height L2 and not higher than a workpiece upper surface height (table upper surface height L2+workpiece thickness L5).

$$\text{table upper surface height } L2 \leq \text{working fluid level } L3' \text{ on measurement} \leq \text{table upper surface height } L2+\text{workpiece thickness } L5 \quad \text{(Expression 2)}$$

Hence, even when measuring, it is possible to prevent thermal displacement of at least the table 24 of stainless steel of high linear expansion coefficient, and an additional sub-table for supporting the workpiece 26. It is also possible to prevent a decrease in temperature of the workpiece lower surface due to heat of evaporation, to thereby suppress the variation in the temperature of the entire workpiece 26. Since this can reduce the dimensional deviation between the machining position and the measuring position caused by temperature variation, the dimensions can be measured far more accurately than measuring after discharging all working fluid 4.

Figure 10:
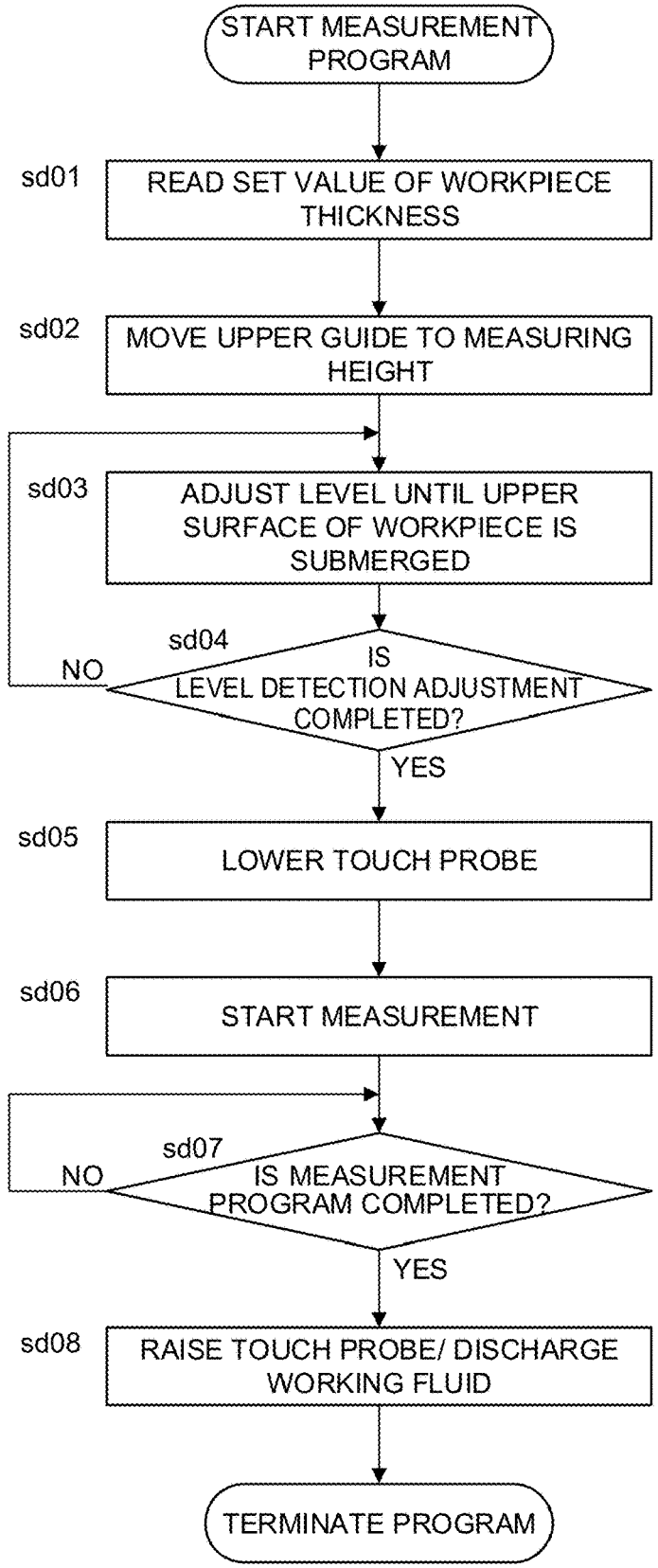
FIG. 10 is a flowchart showing the process of measurement program when measuring.

FIG. 10 is a flowchart illustrating the process to be effected in a measurement program of Embodiment 2 of the present invention. The measurement program will now be described, according to the steps.
[Step sd01] Read the preset value of workpiece thickness.
[Step sd02] Move upper guide to measuring height.
[Step sd03] Adjust the level to height where upper surface of table is immersed.
[Step sd04] Determine whether the adjustment through level detection is completed, and if completed, proceed to Step sd05, and if not completed, return to Step sd03.

[Step sd05] Lower the touch probe.
[Step sd06] Start measurement.
[Step sd07] Determine whether the measurement program is completed, and if completed, proceed to Step sd08, and if not completed, wait for completion of measurement program.
[Step sd08] Raise the touch probe, discharge water, and terminate the program.

The following is supplementary explanation about the flowchart described above. Step sd01 corresponds to plate thickness acquisition means or setting means of the claims. Step sd03 corresponds to level adjustment means.

As another mode of Embodiment 2, an optical measurement device having a measuring function for detecting an edge part of a workpiece by recognizing an image of the part to be measured may be used, instead of the touch probe 3.

Embodiment 3

Figure 11:
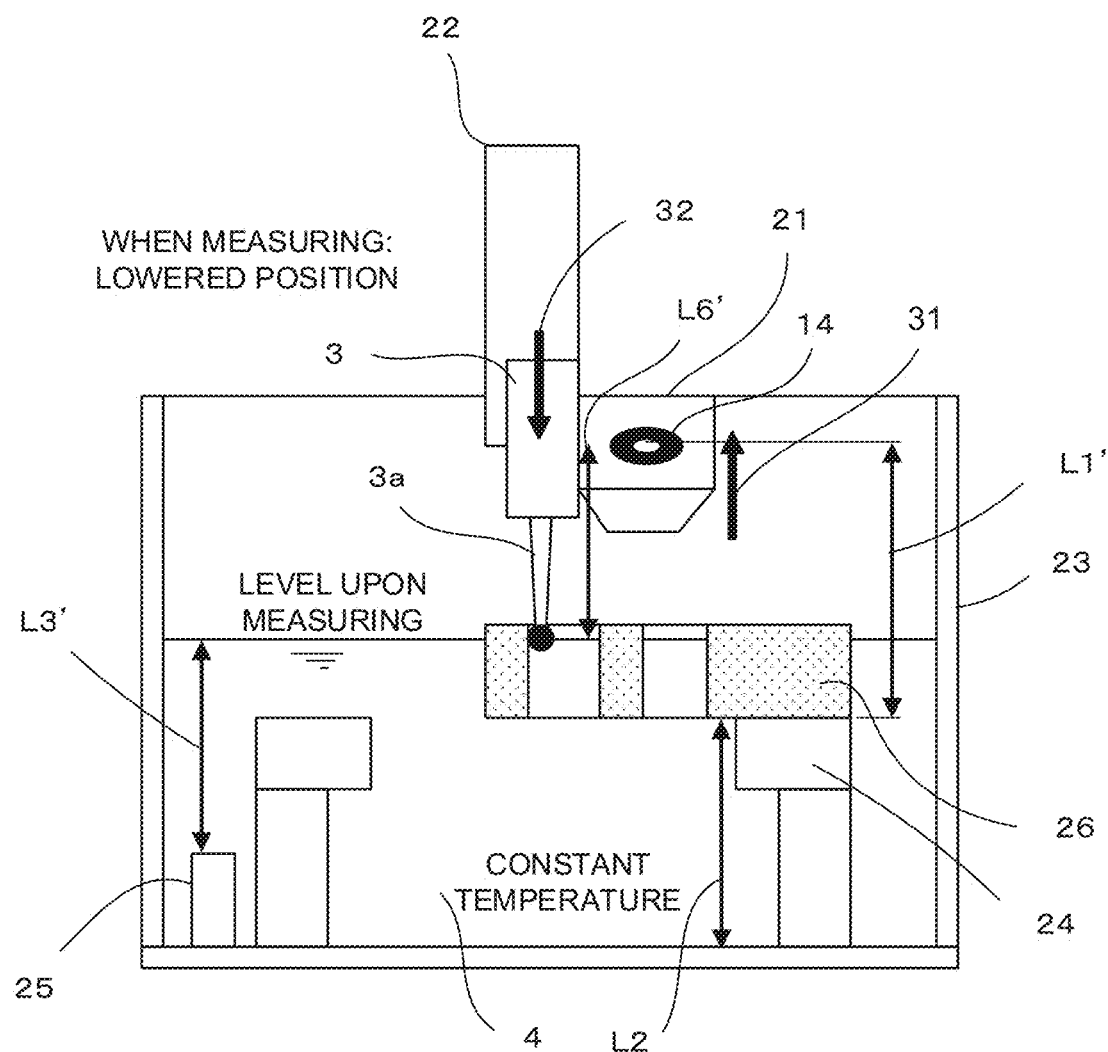
FIG. 11 is a diagram illustrating the principle for controlling the level upon measuring in Embodiment 3.

(When Machining)
The steps effected upon working are the same as those explained in the description of the first embodiment so that no explanation are made to avoid the duplication.
(When Measuring)
FIG. 11 is a diagram illustrating how the level is controlled when measuring in Embodiment 3.

When measuring, an upper guide part 21 is raised (see reference numeral 31), and a touch probe 3 is positioned in a lowered position (see reference numeral 32), or is attached to the upper guide part 21. Then, a level detector such as a hydraulic pressure sensor 25, and an unillustrated working fluid supply device and discharge device automatically adjust the level of a working fluid to a position near the height of a sensor 3a on the tip end of the touch probe 3. At this time, a preset upper guide height on measurement L1', and a distance from the upper guide height on measurement L1' to the sensor 3a on the tip end of the touch probe 3 (sensor position upon measurement L6') are used, to adjust the level in conjunction with the height position of the sensor 3a on the tip end of the touch probe 3.

working fluid level on measurement $L3'$=table upper surface height $L2$+upper guide height on measurement $L1'$−sensor position on measurement $L6'$ (Expression 3)

Hence, even when measuring, it is possible to prevent thermal displacement of at least the table 24 of stainless steel of high linear expansion coefficient, and an additional sub-table for supporting a workpiece 26. It is also possible to prevent a decrease in temperature of the workpiece 26 due to heat of evaporation, to thereby suppress variation in the temperature of the entire workpiece 26. Since this can reduce the dimensional deviation between the machining position and the measuring position caused by temperature variation, the dimensions can be measured far more accurately than measuring after discharging a working fluid 4.

Figure 12:
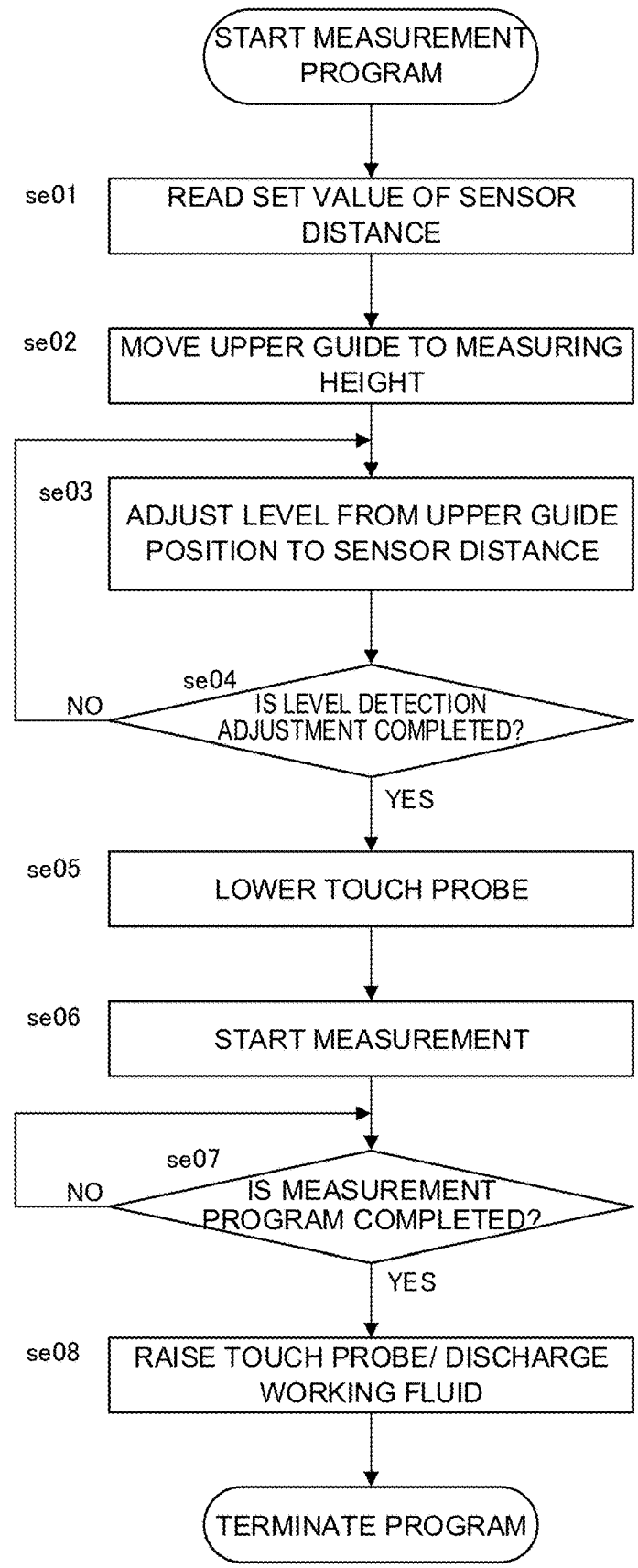
FIG. 12 is a flowchart showing the process of measurement program when measuring.

FIG. 12 is a flowchart illustrating the process to be effected in a measurement program of Embodiment 3 of the present invention. The measurement program will now be described, according to the steps.
[Step se01] Read preset value of sensor distance (sensor position upon measurement L6').
[Step se02] Move upper guide to measuring height.
[Step se03] Adjust the level from upper guide position to sensor distance.
[Step se04] Determine whether the adjustment through level detection is completed, and if completed, proceed to Step se05, and if not completed, return to Step se03.
[Step se05] Lower the touch probe.
[Step se06] Start measurement.
[Step se07] Determine whether the measurement program is completed, and if completed, proceed to Step se08, and if not completed, wait for completion of the measurement program.
[Step se08] Raise the touch probe, discharge water, and terminate the process.

Embodiment 4

Figure 13:
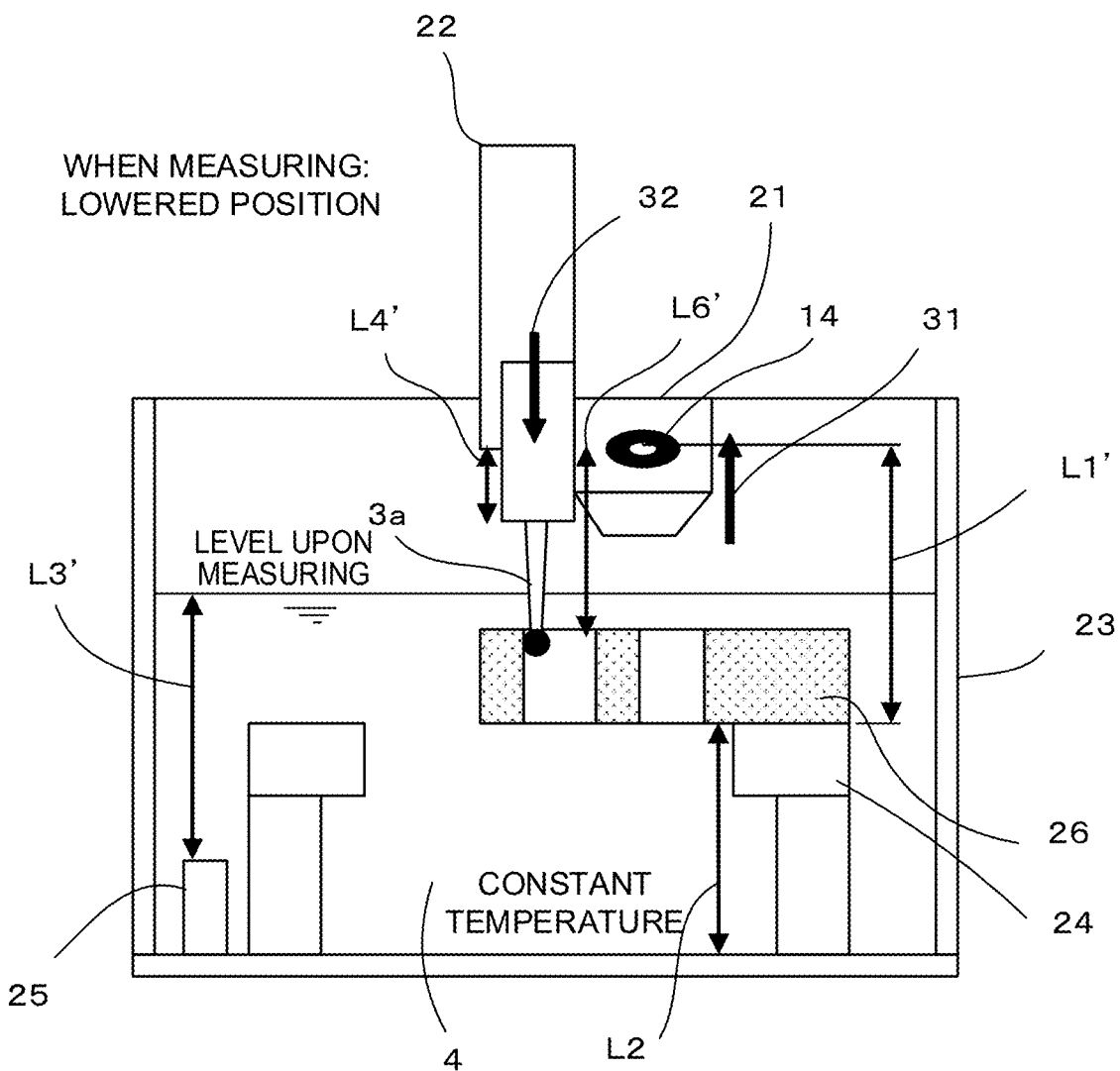
FIG. 13 is a diagram illustrating the principle for controlling the level upon measuring in Embodiment 4.

(When Machining)
The steps effected upon working are the same as those explained in the description of the first embodiment so that no explanation are made to avoid the duplication.
(When Measuring)
FIG. 13 is a diagram illustrating the principle for controlling the level upon measurement in Embodiment 4.

When measuring, an upper guide part 21 is raised (see reference numeral 31), a touch probe 3 is positioned in a lowered position (see reference numeral 32), or is attached to the upper guide part 21. Then, a level detector such as a hydraulic pressure sensor 25, and an unillustrated working fluid supply device and discharge device automatically adjust the level of a working fluid when measuring, to a position between the height of a sensor 3a on the tip end of the touch probe 3 and the body (lowermost part of body) of the touch probe 3. At this time, a preset upper guide height on measurement L1', and a distance from the upper guide height on measurement L1' to the sensor 3a on the tip end of the touch probe 3 (sensor position on measurement L6') are used, to adjust the level in conjunction with the height position of the sensor 3a on the tip end of the touch probe 3.

table upper surface height $L2$+upper guide height on measurement $L1'$−sensor position on measurement $L6'$≤working fluid level on measurement $L3'$≤table upper surface height $L2$+upper guide height on measurement $L1'$−measurement device body position on measurement $L4'$. (Expression 4)

Hence, even when measuring, it is possible to prevent thermal displacement of the table 24 of stainless steel of high linear expansion coefficient, and an additional sub-table for supporting a workpiece 26. It is also possible to prevent a decrease in temperature of the workpiece 26 due to heat of evaporation, to thereby suppress variation in the temperature of the entire workpiece 26. Since this can reduce the dimensional deviation between the machining position and the measuring position caused by temperature variation, the dimensions can be measured far more accurately than measuring after discharging a working fluid 4.

Figure 14:
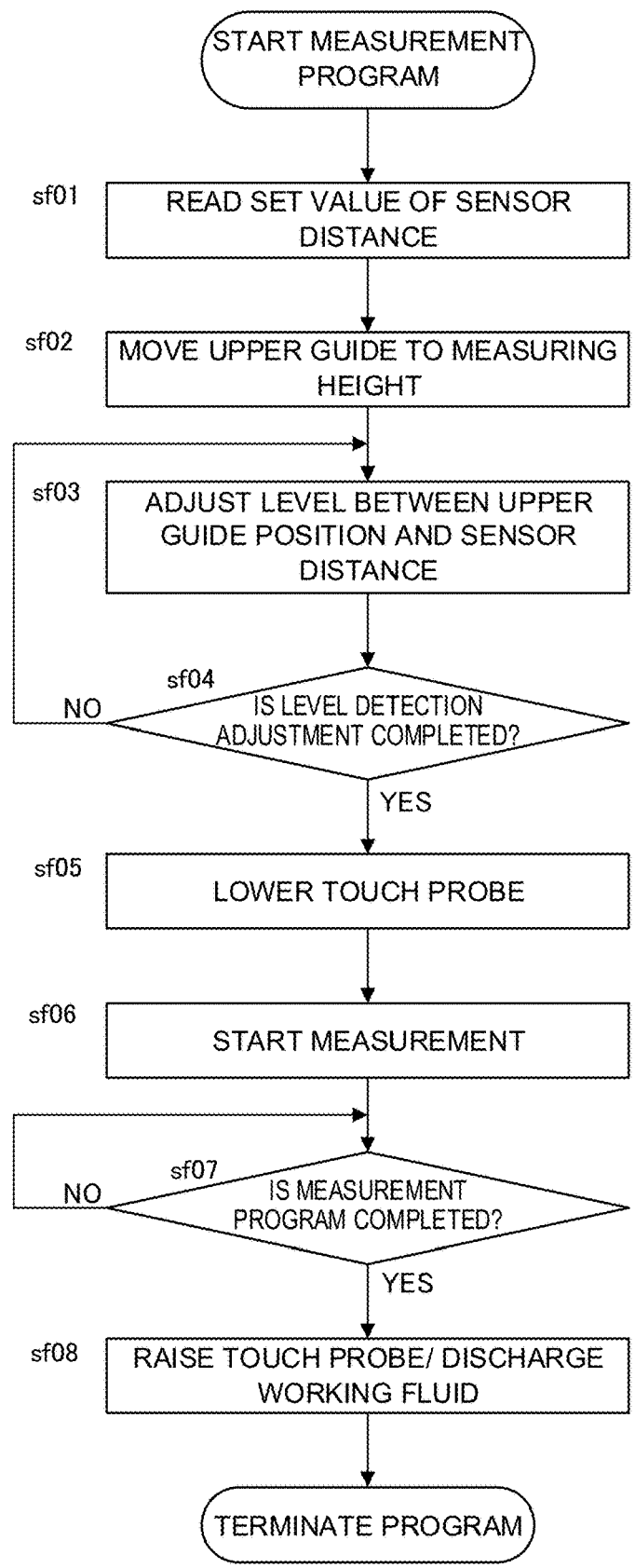
FIG. 14 is a flowchart showing the process of measurement program when measuring.

FIG. 14 is a flowchart illustrating the processing of a measurement program of Embodiment 4 of the present invention. The measurement program will now be described, according to the steps.
[Step sf01] Read set value of sensor distance.
[Step sf02] Move upper guide to measuring height.
[Step sf03] Adjust the level of working liquid on the basis of the level detector to that between the upper guide position upon measurement and the sensor position upon measurement.
[Step sf04] Determine whether the adjustment on the basis of the level detector is completed, and if completed, proceed to Step sf05, and if not completed, return to Step sf03.
[Step sf05] Lower the touch probe.
[Step sf06] Start measurement.

[Step sf07] Determine whether the measurement program is completed, and if completed, proceed to Step sf08, and if not completed, wait for completion of measurement program.
[Step sf08] Raise the touch probe, discharge water, and terminate the process.

Figure 15:
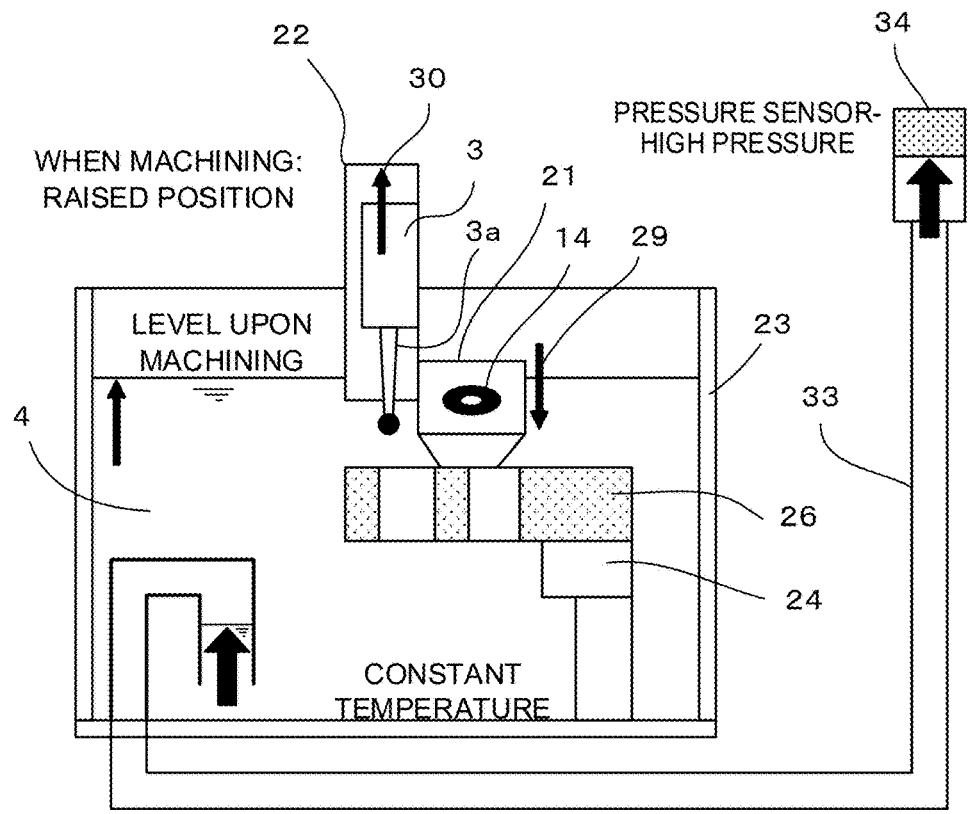
FIG. 15 is a diagram illustrating the principle for controlling the level upon machining, by means of a pressure sensor placed outside of a work tank.
Figure 16:
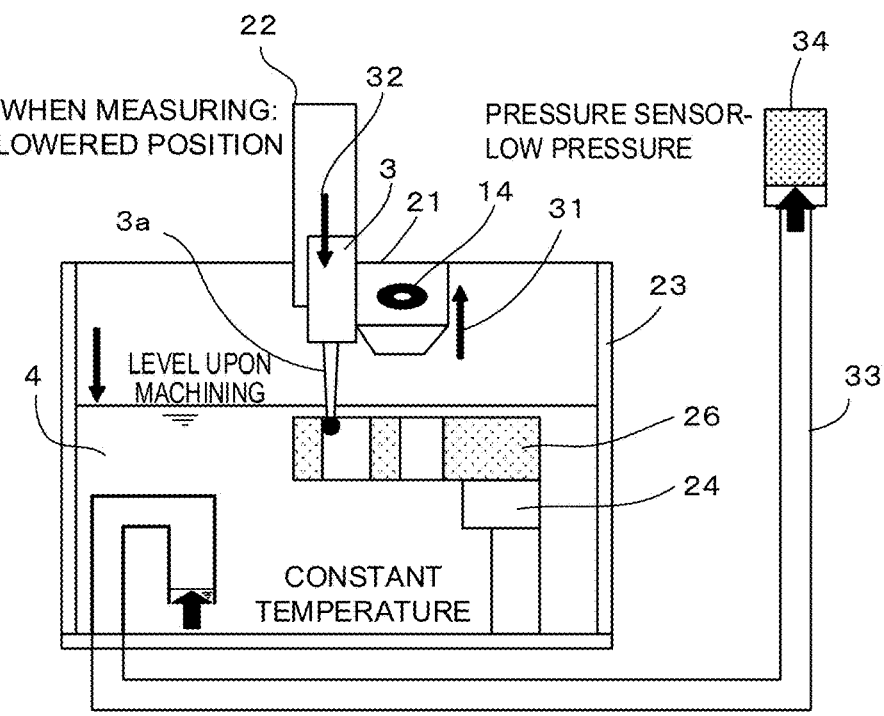
FIG. 16 is a diagram illustrating the principle for controlling the level upon measuring, by means of the pressure sensor placed outside of the work tank.

Next, another example of measuring the level of a working fluid 4 inside a work tank will be described. FIG. 15 is a diagram illustrating the principle for controlling the level upon machining. Level detection means may be a sensor for detecting the hydraulic pressure near the bottom of the work tank 23. The level detection means of a structure as shown in FIG. 15 may also be used. In this structure, the hydraulic pressure is converted to the pressure of the air contained in the conduit 33, and thus converted pressure is detected by the pressure sensor 34. The level of the working liquid can be calculated from the detected pressure. This level measuring means is applicable to Embodiments 1 to 4. FIG. 16 is a diagram illustrating the principle for controlling upon measuring.

Figure 17:
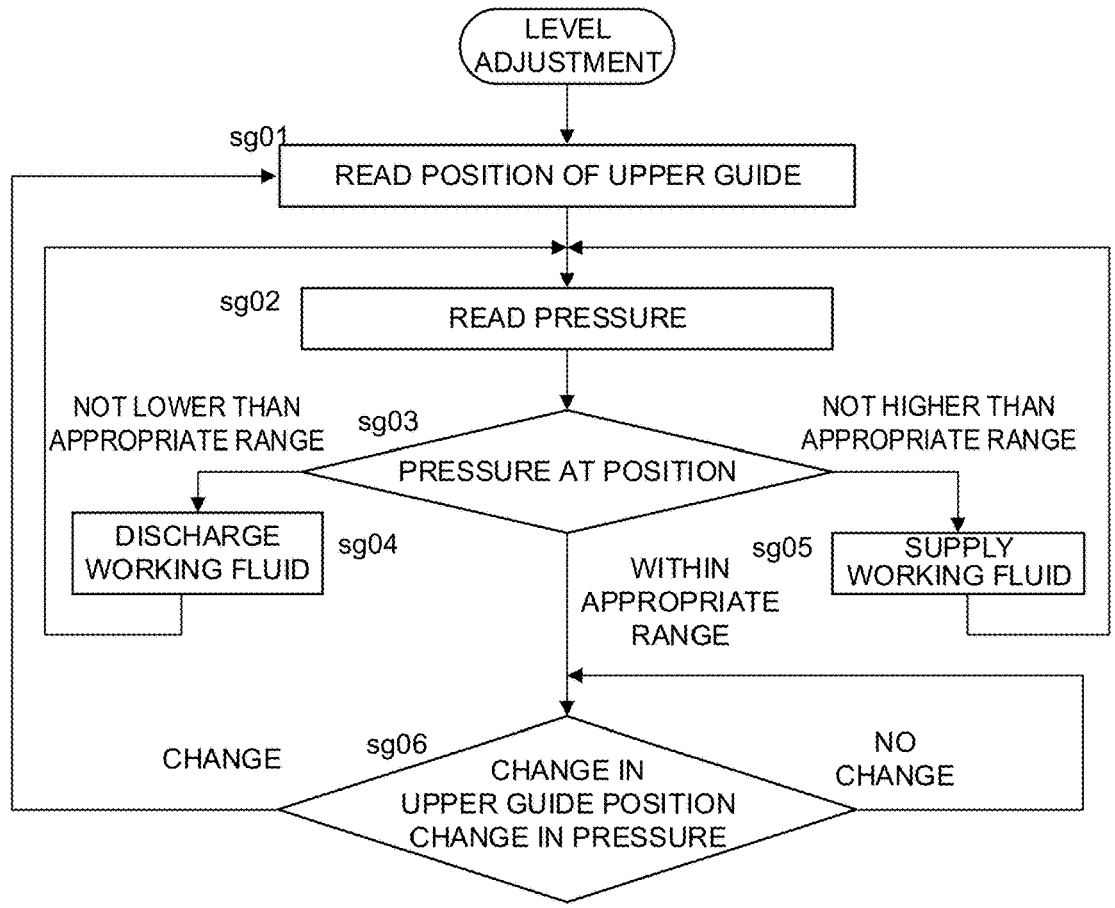
FIG. 17 is a flowchart showing the process for automatically adjusting the level of working fluid inside the work tank in conjunction with a height position of an upper guide, depending on a pressure detected by a level detector such as a hydraulic pressure sensor.
Figure 20:
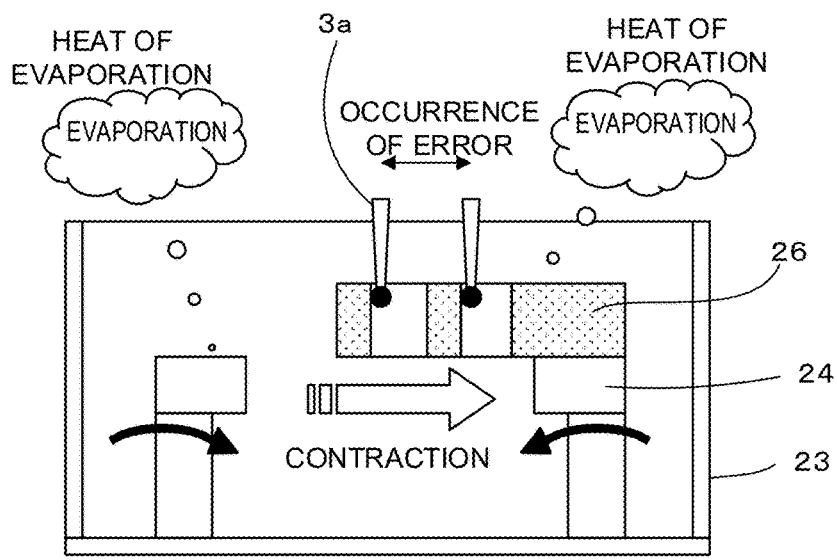
FIG. 20 is a diagram illustrating the principle of the occurrence of an error while the measurement of the workpiece is effected within the work tank vacant of working fluid.
Figure 18:
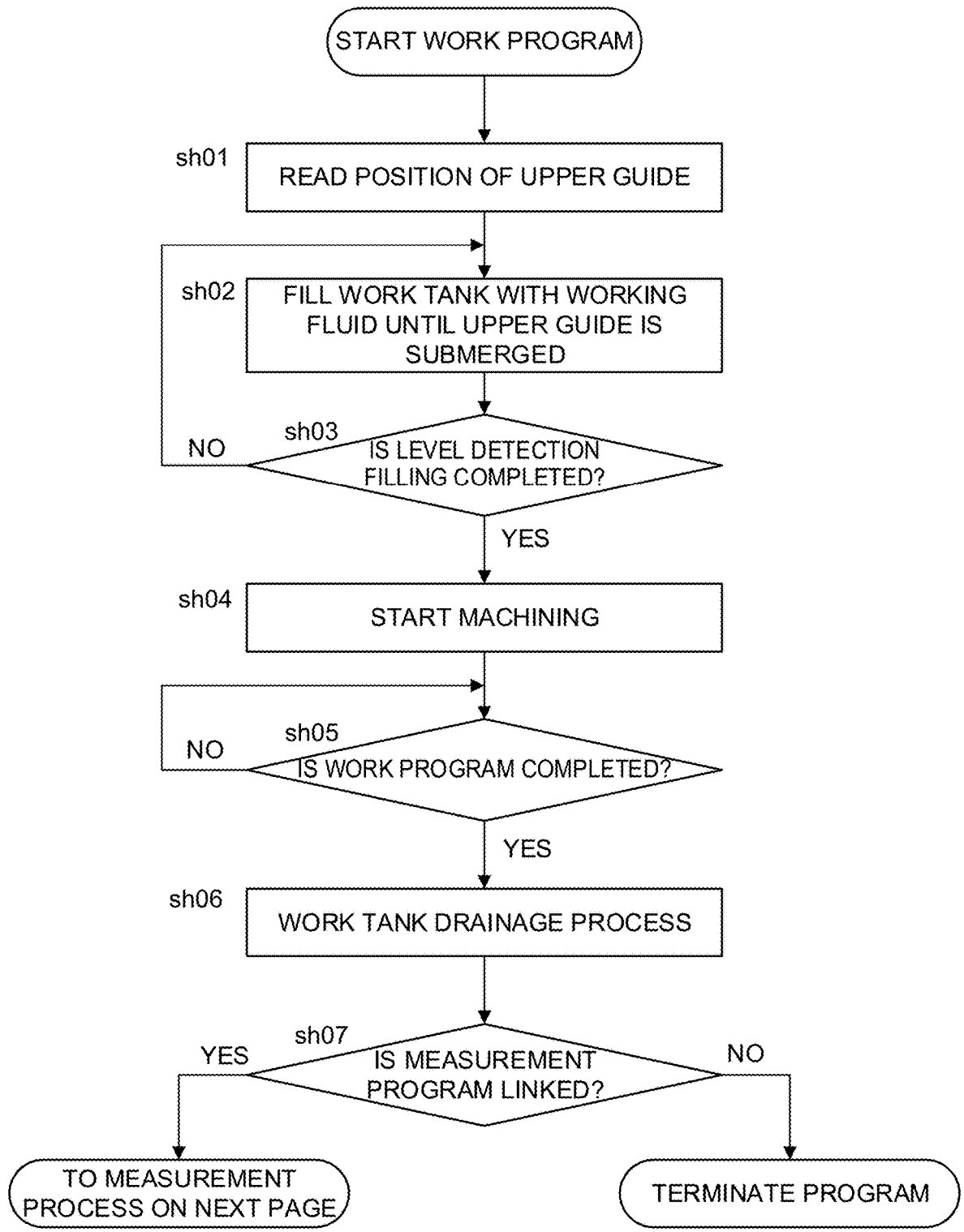
FIG. 18 is a flowchart (No. 1) showing a conventional measurement flow.
Figure 19:
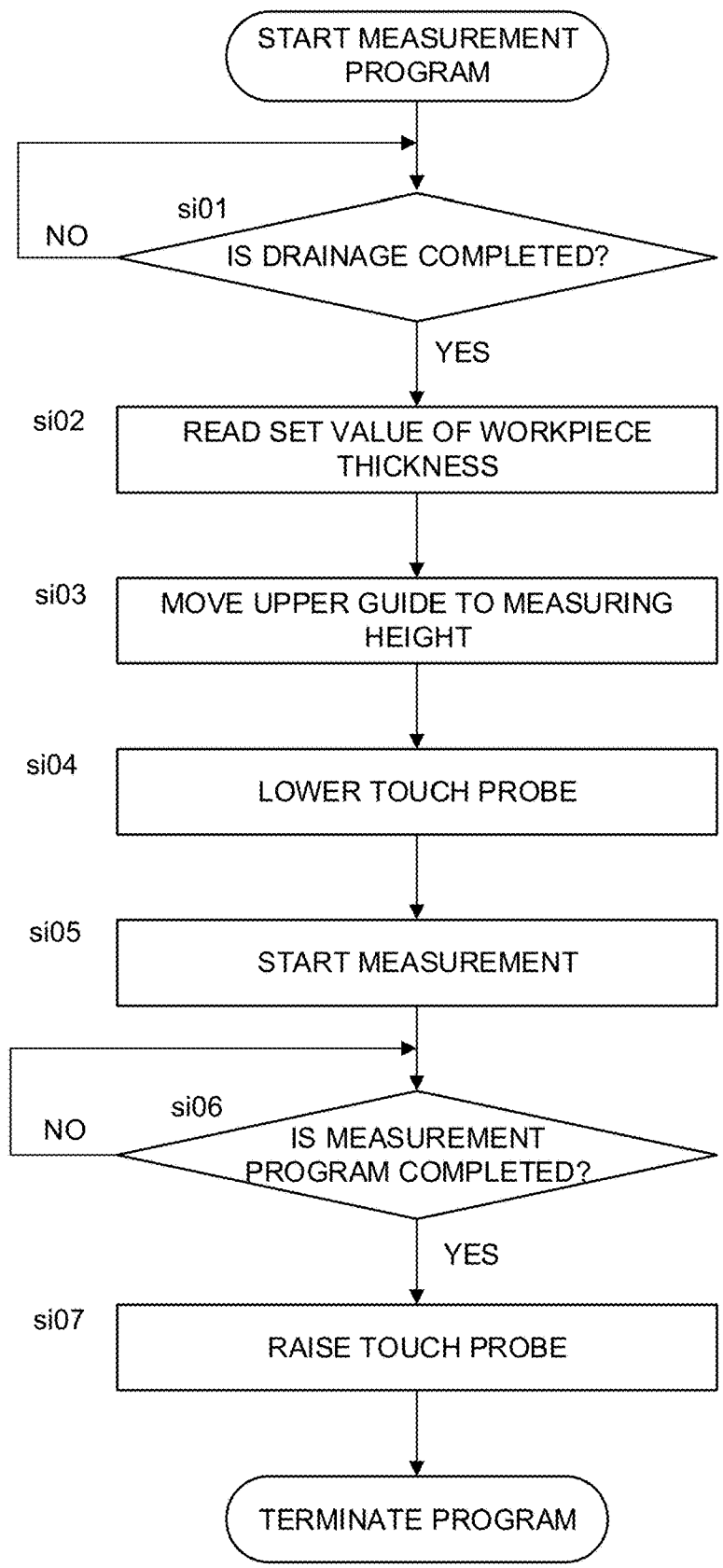
FIG. 19 is a flowchart (No. 2) showing the conventional measurement flow.

FIG. 17 is a flowchart showing the process for automatically adjusting the level of a working fluid inside a work tank, in conjunction with the height position of an upper guide, and in dependence on a pressure detected by a level detector such as a hydraulic sensor. The process is applicable for the adjustment of the level of a working fluid automatically when measuring, in the aforementioned embodiments.
[Step sg01] Read the position of upper guide.
[Step sg02] Read pressure of level sensor.
[Step sg03] Determine whether pressure at measuring position exceeds appropriate range, falls below appropriate range, or is within appropriate range, and if it exceeds appropriate range, proceed to Step sg04, if it falls below appropriate range, proceed to Step sg05, and if it is within appropriate range, terminate the process for adjusting the level.
[Step sg04] Discharge working fluid from the work tank.
[Step sg05] Supply working fluid into the work tank.
[Step sg06] Determine whether there is change in upper guide position or pressure, and if there is change, return to Step sg01, and if there is no change, wait for change.

While the present invention have been described above in terms of the preferred embodiments thereof, it is not intended to be so limited, and can be implemented in other modes by adding changes according to need.

The invention claimed is:
1. A wire electric discharge machine, comprising:
a wire electric discharge machine body configured to machine a workpiece;
a work tank containing a working fluid;
a table which is provided in the work tank and on which the workpiece is to be mounted;
an upper guide and a lower guide supporting a wire electrode;
a measurement device detachable from or movable relative to an upper guide part having the upper guide, the measurement device including a sensor on a tip end of the measurement device;
a controller including a processor, a memory, an interface connected to the wire electric discharge machine body, and a servo amplifier connected to a servo motor and configured to drive the servo motor, the controller configured to
control the wire electric discharge machine body to perform machining of the workpiece immersed in the working fluid according to a machining program, and
after said machining, measure dimensions of the machined workpiece by the sensor of the measurement device; and
an adjustment mechanism including at least a water level sensor, a valve, a valve switch, and a pump, the water level sensor configured to detect a level of the working fluid in the work tank, wherein
the controller is configured to
acquire, from the memory, a preset value of a plate thickness of the workpiece between an upper surface of the workpiece and a lower surface of the workpiece, and
while measuring the dimensions of the machined workpiece immersed in the working fluid by the sensor of the measurement device after said machining, control the adjustment mechanism to adjust the level of the working fluid on the basis of
(i) a present height position of an upper surface of the table acquired from the memory,
(ii) a position of the upper guide detected by a position detector of the servo motor, and
(iii) the preset value of the plate thickness of the workpiece,
by controlling working fluid supply to the work tank and working fluid discharge from the work tank, so that the level of the working fluid in the work tank detected by the water level sensor is not lower than a height of the upper surface of the workpiece and not higher than a body of the measurement device, and
after said machining, measure the dimensions of the machined workpiece while
(1) the machined workpiece is kept being mounted on the table,
(2) the workpiece is immersed in the working fluid with the level being adjusted, and
(3) the body of the measurement device is positioned above the level of the working fluid.
2. A wire electric discharge machine, comprising:
a wire electric discharge machine body configured to machine a workpiece;
a work tank containing a working fluid;
a table which is provided in the work tank and on which the workpiece is to be mounted;
an upper guide and a lower guide supporting a wire electrode;
a measurement device detachable from or movable relative to an upper guide part having the upper guide, the measurement device including a sensor on a tip end of the measurement device;
a controller including a processor, a memory, an interface connected to the wire electric discharge machine body, and a servo amplifier connected to a servo motor and configured to drive the servo motor, the controller configured to
control the wire electric discharge machine body to perform machining of the workpiece immersed in the working fluid according to a machining program, and
after said machining, measure dimensions of the machined workpiece by the sensor of the measurement device,
an adjustment mechanism including at least a water level sensor, a valve, a valve switch, and a pump, wherein
the controller is configured to acquire, from the memory, a preset value of a plate thickness of the workpiece between an upper surface of the workpiece and a lower surface of the workpiece, and while measuring the dimensions of the machined workpiece immersed in the working fluid by the sensor of the measurement device after said machining, control the adjustment mechanism to adjust the level of the working fluid on the basis of a level of the working fluid in the work tank detected by the water level sensor, by controlling working fluid supply to the work tank and working fluid discharge from the work tank, so that the level of the working fluid in the work tank detected by the water level sensor is not lower than a preset height of an upper surface of the table on which the workpiece is placed, and not higher than a height of the upper surface of the workpiece, the preset height of the upper surface of the table stored in the memory, and after said machining, measure the dimensions of the machined workpiece while
(1) the machined workpiece is kept being mounted on the table,
(2) the workpiece is immersed in the working fluid with the level being adjusted, and
(3) a body of the measurement device is positioned above the level of the working fluid.

3. A wire electric discharge machine, comprising:
a wire electric discharge machine body configured to machine a workpiece;
a work tank containing a working fluid;
a table which is provided in the work tank and on which the workpiece is to be mounted;
an upper guide and a lower guide supporting a wire electrode;
a measurement device detachable from or movable relative to an upper guide part having the upper guide, the measurement device including a sensor on a tip end of the measurement device;
a controller including a processor, a memory, an interface connected to the wire electric discharge machine body, and a servo amplifier connected to a servo motor and configured to drive the servo motor, the controller configured to
control the wire electric discharge machine body to perform machining of the workpiece immersed in the working fluid according to a machining program, and
after said machining, measure dimensions of the machined workpiece by the sensor of the measurement device; and
an adjustment mechanism including at least a water level sensor, a valve, a valve switch, and a pump, the water level sensor configured to detect a level of the working fluid in the work tank, wherein
the controller is configured to
while measuring the dimensions of the machined workpiece immersed in the working fluid by the sensor of the measurement device after said machining, control the adjustment mechanism to adjust the level of the working fluid on the basis of
(i) a position of the upper guide detected by a position detector of the servo motor, and
(ii) a distance from the position of the upper guide to a tip end of the sensor of the measurement device at a first position where the sensor is attached to the upper guide, or at a second position to which the sensor is fixed to a member that is movable vertically, by controlling water supply to the work tank and water discharge from the work tank, so that the level detected by the water level sensor varies in conjunction with a position of the tip end of the sensor of the measurement device at the first position where the sensor is attached to the upper guide, or at the second position to which the sensor is lowered while being fixed in the vertically movable manner, and after said machining, measure the dimensions of the machined workpiece while
(1) the machined workpiece is kept being mounted on the table,
(2) the workpiece is immersed in the working fluid with the level being adjusted, and
(3) a body of the measurement device is positioned above the level of the working fluid.

4. A wire electric discharge machine, comprising:
a wire electric discharge machine body configured to machine a workpiece;
a work tank containing a working fluid;
a table which is provided in the work tank and on which the workpiece is to be mounted;
an upper guide and a lower guide supporting a wire electrode;
a measurement device detachable from or movable relative to an upper guide part having the upper guide, the measurement device including a sensor on a tip end of the measurement device;
a controller including a processor, a memory, an interface connected to the wire electric discharge machine body, and a servo amplifier connected to a servo motor and configured to drive the servo motor, the controller configured to
control the wire electric discharge machine body to perform machining of the workpiece immersed in the working fluid according to a machining program, and
measure dimensions of the machined workpiece by the sensor of the measurement device; and
an adjustment mechanism including at least a water level sensor, a valve, a valve switch, and a pump, the water level sensor configured to detect a level of the working fluid in the work tank, wherein
the controller is configured to,
while measuring the dimensions of the machined workpiece immersed in the working fluid by the sensor of the measurement device after said machining, control the adjustment mechanism to adjust the level of the working fluid, by
obtaining (i) a distance from a preset position of the upper guide to a tip end of the sensor, and (ii) a distance from an upper surface of the table to a body of the sensor, the upper surface of the table at a preset height stored in the memory, and
controlling water supply to the work tank and water discharge from the work tank, so that
the level detected by the water level sensor varies in conjunction with a position of the sensor of the measurement device, and
the level is not lower than a height of the upper surface of the table on which the workpiece is mounted, and not higher than a body of the measurement device, and
after said machining, measure the dimensions of the machined workpiece while (1) the machined workpiece is kept being mounted on the table,
(2) the workpiece is immersed in the working fluid with the level being adjusted, and
(3) the body of the measurement device is positioned above the level of the working fluid.

5. The wire electric discharge machine according to claim 1, wherein
the water level sensor comprises a pressure sensor configured to detect hydraulic pressure near the bottom of the work tank, or pneumatic pressure into which the hydraulic pressure is converted, and calculate a height of the level according to the detected pressure.

6. A wire electric discharge machine, comprising:
a wire electric discharge machine body configured to machine a workpiece;
a work tank containing a working fluid;
a table which is provided in the work tank and on which the workpiece is to be mounted;
an upper guide and a lower guide supporting a wire electrode;
an optical measurement device detachable from or movable relative to an upper guide part having the upper guide, the optical measurement device including a camera and configured for measuring the workpiece by recognizing an image of a measuring part to detect an edge part;
an adjustment mechanism includes at least a water level sensor, a valve, a valve switch, and a pump; and
a controller including a processor, a memory, an interface connected to the wire electric discharge machine body, and a servo amplifier connected to a servo motor and configured to drive the servo motor, the controller configured to
control the wire electric discharge machine body to perform machining of the workpiece immersed in the working fluid, and
after said machining, measure dimensions of the machined workpiece by the optical measurement device, wherein
the controller is configured to
acquire, from the memory, a preset value of a plate thickness of the workpiece between an upper surface of the workpiece and a lower surface of the workpiece,
control the water level sensor to detect a level of the working fluid in the work tank,
while measuring the dimensions of the machined workpiece immersed in the working fluid by the optical measurement device after said machining, control the adjustment mechanism to adjust the level of the working fluid by controlling working fluid supply to the work tank and working fluid discharge from the work tank, so that the level of the working fluid in the work tank detected by the water level sensor is not lower than a preset height of an upper surface of the table on which the workpiece is placed, and not higher than a height of the upper surface of the workpiece, the preset height of the upper surface of the table stored in the memory, and
after said machining, measure the dimensions of the machined workpiece while
(1) the machined workpiece is kept being mounted on the table,
(2) the workpiece is immersed in the working fluid with the level being adjusted, and
(3) a body of the measurement device is positioned above the level of the working fluid.

7. The wire electric discharge machine according to claim 1, wherein
the controller is further configured to
after said machining, determine whether the workpiece has been machined properly in response to
(1) the measured dimensions of the workpiece measured by the measurement device while the workpiece is still immersed in the working fluid, and
(2) dimensions of the workpiece set in the machining program, and
cause the wire electric discharge machine to re-machine a part of the workpiece for correction of dimensional error while the workpiece is still immersed in the working fluid, in response to a dimensional error of the workpiece found from the measured dimensions measured by the measurement device.

8. The wire electric discharge machine according to claim 2, wherein
the controller is further configured to
after said machining, determine whether the workpiece has been machined properly in response to
(1) the measured dimensions of the workpiece measured by the measurement device while the workpiece is still immersed in the working fluid and
(2) dimensions of the workpiece set in the machining program, and
cause the wire electric discharge machine to re-machine a part of the workpiece while the workpiece is still immersed in the working fluid, in response to a dimensional error of the workpiece found from the measured dimensions measured by the measurement device.

9. The wire electric discharge machine according to claim 3, wherein
the controller is further configured to
after said machining, determine whether the workpiece has been machined properly in response to
(1) the measured dimensions of the workpiece measured by the measurement device while the workpiece is still immersed in the working fluid, and
(2) dimensions of the workpiece set in the machining program, and
cause the wire electric discharge machine to re-machine a part of the workpiece for correction of dimensional error while the workpiece is still immersed in the working fluid, in response to a dimensional error of the workpiece found from the measured dimensions measured by the measurement device.

10. The wire electric discharge machine according to claim 4, wherein
the controller is further configured to
after said machining, determine whether the workpiece has been machined properly in response to
(1) the measured dimensions of the workpiece measured by the measurement device while the workpiece is still immersed in the working fluid, and
(2) dimensions of the workpiece set in the machining program, and
cause the wire electric discharge machine to re-machine a part of the workpiece for correction of dimensional error while the workpiece is still immersed in the working fluid, in response to a dimensional error of the workpiece found from the measured dimensions measured by the measurement device.

11. The wire electric discharge machine according to claim 6, wherein
the controller is further configured to
determine whether the workpiece has been machined properly in response to
(1) the measured dimensions of the workpiece measured by the optical measurement device while the workpiece is still immersed in the working fluid, and
(2) dimensions of the workpiece set in a machining program, and
cause the wire electric discharge machine to re-machine a part of the workpiece for correction of dimensional error while the workpiece is still immersed in the working fluid, in response to a dimensional error of the workpiece found from the measured dimensions measured by the optical measurement device.

\* \* \* \* \*